United States Patent
Olshansky

(10) Patent No.: US 11,966,429 B2
(45) Date of Patent: Apr. 23, 2024

(54) MONITORING THIRD-PARTY FORUM CONTRIBUTIONS TO IMPROVE SEARCHING THROUGH TIME-TO-LIVE DATA ASSIGNMENTS

(71) Applicant: On Time Staffing Inc., Golden Valley, MN (US)

(72) Inventor: Roman Olshansky, Plymouth, MN (US)

(73) Assignee: On Time Staffing Inc., Golden Valley, MN (US)

( * ) Notice: Subject to any disclaimer, the term of this patent is extended or adjusted under 35 U.S.C. 154(b) by 0 days.

(21) Appl. No.: 17/500,687

(22) Filed: Oct. 13, 2021

(65) Prior Publication Data
US 2023/0045662 A1 Feb. 9, 2023

Related U.S. Application Data

(63) Continuation of application No. 17/396,294, filed on Aug. 6, 2021, now Pat. No. 11,727,040.

(51) Int. Cl.
*G06F 16/335* (2019.01)
*G06F 16/332* (2019.01)
(Continued)

(52) U.S. Cl.
CPC ........ *G06F 16/335* (2019.01); *G06F 16/3326* (2019.01); *G06F 16/951* (2019.01); *G06Q 10/0639* (2013.01); *G06Q 50/01* (2013.01)

(58) Field of Classification Search
CPC .. G06F 16/335; G06F 16/3326; G06F 16/951; G06Q 50/01
See application file for complete search history.

(56) References Cited

U.S. PATENT DOCUMENTS

| 1,173,785 | A | 2/1916 | Deagan |
| 1,686,351 | A | 10/1928 | Spitzglass |

(Continued)

FOREIGN PATENT DOCUMENTS

| AU | 2002310201 | 3/2003 |
| AU | 2007249205 | 3/2013 |

(Continued)

OTHER PUBLICATIONS

"Air Canada Keeping Your Points Active Aeroplan," https://www.aircanada.com/us/en/aco/home/aeroplan/your-aeroplan/inactivity-policy.html, 6 pages.

(Continued)

*Primary Examiner* — Kannan Shanmugasundaram
(74) *Attorney, Agent, or Firm* — Pauly, DeVries Smith & Deffner LLC

(57) ABSTRACT

A system and method are presented that improves search results based on skills associated with individuals. The system monitors an individual's contributions to a third-party forum and associates the contributions with skills. The system also monitors learnings received by the individual. Assignments are made to associate the individual with the skills and to assign points. Users request a search based on search skill parameters, and the system uses forum-based data and non-forum data to identify and sort individuals. Skill and point assignments are made temporarily, and assignments are deleted upon the expiration of a time-to-live clock. Save events can permanently save data. Local forum data is also stored and can be used to restore deleted assignments. Points are used to improve avatars used when interacting with searching users.

25 Claims, 11 Drawing Sheets

(51) Int. Cl.
  *G06F 16/951* (2019.01)
  *G06Q 10/0639* (2023.01)
  *G06Q 50/00* (2012.01)

(56) References Cited

U.S. PATENT DOCUMENTS

| | | | |
|---|---|---|---|
| 3,152,622 A | 10/1964 | Rothermel | |
| 3,764,135 A | 10/1973 | Madison | |
| 5,109,281 A | 4/1992 | Kobori et al. | |
| 5,410,344 A | 4/1995 | Graves et al. | |
| 5,835,667 A | 11/1998 | Wactlar et al. | |
| 5,867,209 A | 2/1999 | Irie et al. | |
| 5,884,004 A | 3/1999 | Sato et al. | |
| 5,886,967 A | 3/1999 | Aramaki | |
| 5,897,220 A | 4/1999 | Huang et al. | |
| 5,906,372 A | 5/1999 | Recard | |
| 5,937,138 A | 8/1999 | Fukuda et al. | |
| 5,949,792 A | 9/1999 | Yasuda et al. | |
| 6,128,414 A | 10/2000 | Liu | |
| 6,229,904 B1 | 5/2001 | Huang et al. | |
| 6,289,165 B1 | 9/2001 | Abecassis | |
| 6,484,266 B2 | 11/2002 | Kashiwagi et al. | |
| 6,502,199 B2 | 12/2002 | Kashiwagi et al. | |
| 6,504,990 B1 | 1/2003 | Abecassis | |
| RE37,994 E | 2/2003 | Fukuda et al. | |
| 6,600,874 B1 | 7/2003 | Fujita et al. | |
| 6,618,723 B1 | 9/2003 | Smith | |
| 6,981,000 B2 | 12/2005 | Park et al. | |
| 7,095,329 B2 | 8/2006 | Saubolle | |
| 7,146,627 B1 | 12/2006 | Ismail et al. | |
| 7,293,275 B1 | 11/2007 | Krieger et al. | |
| 7,313,539 B1 | 12/2007 | Pappas et al. | |
| 7,336,890 B2 | 2/2008 | Lu et al. | |
| 7,499,918 B2 | 3/2009 | Ogikubo | |
| 7,606,444 B1 | 10/2009 | Erol et al. | |
| 7,650,286 B1 | 1/2010 | Obeid | |
| 7,702,542 B2 | 4/2010 | Aslanian | |
| 7,725,812 B1 | 5/2010 | Balkus et al. | |
| 7,797,402 B2 | 9/2010 | Roos | |
| 7,810,117 B2 | 10/2010 | Karnalkar et al. | |
| 7,865,424 B2 | 1/2011 | Pappas et al. | |
| 7,895,620 B2 | 2/2011 | Haberman et al. | |
| 7,904,490 B2 | 3/2011 | Ogikubo | |
| 7,962,375 B2 | 6/2011 | Pappas et al. | |
| 7,974,443 B2 | 7/2011 | Kipman et al. | |
| 7,991,635 B2 | 8/2011 | Hartmann | |
| 7,996,292 B2 | 8/2011 | Pappas et al. | |
| 8,032,447 B2 | 10/2011 | Pappas et al. | |
| 8,046,814 B1 | 10/2011 | Badenell | |
| 8,099,415 B2 | 1/2012 | Luo et al. | |
| 8,111,326 B1 | 2/2012 | Talwar | |
| 8,169,548 B2 | 5/2012 | Ryckman | |
| 8,185,543 B1 | 5/2012 | Choudhry et al. | |
| 8,229,841 B2 | 7/2012 | Pappas et al. | |
| 8,238,718 B2 | 8/2012 | Toyama et al. | |
| 8,241,628 B2 | 8/2012 | Diefenbach-Streiber et al. | |
| 8,266,068 B1 | 9/2012 | Foss et al. | |
| 8,300,785 B2 | 10/2012 | White | |
| 8,301,550 B2 | 10/2012 | Pappas et al. | |
| 8,301,790 B2 | 10/2012 | Morrison et al. | |
| 8,326,133 B2 | 12/2012 | Lemmers | |
| 8,326,853 B2 | 12/2012 | Richard et al. | |
| 8,331,457 B2 | 12/2012 | Mizuno et al. | |
| 8,331,760 B2 | 12/2012 | Butcher | |
| 8,339,500 B2 | 12/2012 | Hattori et al. | |
| 8,358,346 B2 | 1/2013 | Hikita et al. | |
| 8,387,094 B1 | 2/2013 | Ho et al. | |
| 8,505,054 B1 | 8/2013 | Kirley | |
| 8,508,572 B2 | 8/2013 | Ryckman et al. | |
| 8,543,450 B2 | 9/2013 | Pappas et al. | |
| 8,560,482 B2 | 10/2013 | Miranda et al. | |
| 8,566,880 B2 | 10/2013 | Dunker et al. | |
| 8,600,211 B2 | 12/2013 | Nagano et al. | |
| 8,611,422 B1 | 12/2013 | Yagnik et al. | |
| 8,620,771 B2 | 12/2013 | Pappas et al. | |
| 8,620,872 B1 * | 12/2013 | Killalea | G06F 40/134 707/687 |
| 8,633,964 B1 | 1/2014 | Zhu | |
| 8,650,114 B2 | 2/2014 | Pappas et al. | |
| 8,751,231 B1 | 6/2014 | Larsen et al. | |
| 8,774,604 B2 | 7/2014 | Torii et al. | |
| 8,792,780 B2 | 7/2014 | Hattori | |
| 8,824,863 B2 | 9/2014 | Kitamura et al. | |
| 8,854,457 B2 | 10/2014 | De Vleeschouwer et al. | |
| 8,856,000 B1 | 10/2014 | Larsen et al. | |
| 8,902,282 B1 | 12/2014 | Zhu | |
| 8,909,542 B2 | 12/2014 | Montero et al. | |
| 8,913,103 B1 | 12/2014 | Sargin et al. | |
| 8,918,532 B2 | 12/2014 | Lueth et al. | |
| 8,930,260 B2 | 1/2015 | Pappas et al. | |
| 8,988,528 B2 | 3/2015 | Hikita | |
| 9,009,045 B1 | 4/2015 | Larsen et al. | |
| 9,015,746 B2 | 4/2015 | Holmdahl et al. | |
| 9,026,471 B2 | 5/2015 | Pappas et al. | |
| 9,026,472 B2 | 5/2015 | Pappas et al. | |
| 9,047,634 B2 | 6/2015 | Pappas et al. | |
| 9,064,258 B2 | 6/2015 | Pappas et al. | |
| 9,070,150 B2 | 6/2015 | Pappas et al. | |
| 9,092,813 B2 | 7/2015 | Pappas et al. | |
| 9,106,804 B2 | 8/2015 | Roberts et al. | |
| 9,111,579 B2 | 8/2015 | Meaney et al. | |
| 9,117,201 B2 | 8/2015 | Kennell et al. | |
| 9,129,640 B2 | 9/2015 | Hamer | |
| 9,135,674 B1 | 9/2015 | Yagnik et al. | |
| 9,223,781 B2 | 12/2015 | Pearson et al. | |
| 9,224,156 B2 | 12/2015 | Moorer | |
| 9,305,286 B2 | 4/2016 | Larsen et al. | |
| 9,305,287 B2 | 4/2016 | Krishnamoorthy et al. | |
| 9,355,151 B1 | 5/2016 | Cranfill et al. | |
| 9,378,486 B2 | 6/2016 | Taylor et al. | |
| 9,398,315 B2 | 7/2016 | Oks et al. | |
| 9,402,050 B1 | 7/2016 | Recchia et al. | |
| 9,437,247 B2 | 9/2016 | Pendergast et al. | |
| 9,438,934 B1 | 9/2016 | Zhu | |
| 9,443,556 B2 | 9/2016 | Cordell et al. | |
| 9,456,174 B2 | 9/2016 | Boyle et al. | |
| 9,462,301 B2 | 10/2016 | Paśko | |
| 9,501,663 B1 | 11/2016 | Hopkins et al. | |
| 9,501,944 B2 | 11/2016 | Boneta et al. | |
| 9,542,452 B1 | 1/2017 | Ross et al. | |
| 9,544,380 B2 | 1/2017 | Deng et al. | |
| 9,554,160 B2 | 1/2017 | Han et al. | |
| 9,570,107 B2 | 2/2017 | Boiman et al. | |
| 9,583,144 B2 | 2/2017 | Ricciardi | |
| 9,600,723 B1 | 3/2017 | Pantofaru et al. | |
| 9,607,655 B2 | 3/2017 | Bloch et al. | |
| 9,652,745 B2 | 5/2017 | Taylor et al. | |
| 9,653,115 B2 | 5/2017 | Bloch et al. | |
| 9,666,194 B2 | 5/2017 | Ondeck et al. | |
| 9,684,435 B2 | 6/2017 | Carr et al. | |
| 9,693,019 B1 | 6/2017 | Fluhr et al. | |
| 9,710,790 B2 | 7/2017 | Taylor et al. | |
| 9,723,223 B1 | 8/2017 | Banta et al. | |
| 9,747,573 B2 | 8/2017 | Shaburov et al. | |
| 9,792,955 B2 | 10/2017 | Fleischhauer et al. | |
| 9,805,767 B1 | 10/2017 | Strickland | |
| 9,823,809 B2 | 11/2017 | Roos | |
| 9,876,963 B2 | 1/2018 | Nakamura et al. | |
| 9,881,647 B2 | 1/2018 | McCauley et al. | |
| 9,936,185 B2 | 4/2018 | Delvaux et al. | |
| 9,940,508 B2 | 4/2018 | Kaps et al. | |
| 9,940,973 B2 | 4/2018 | Roberts et al. | |
| 9,979,921 B2 | 5/2018 | Holmes | |
| 10,008,239 B2 | 6/2018 | Eris | |
| 10,019,653 B2 | 7/2018 | Wilf et al. | |
| 10,021,377 B2 | 7/2018 | Newton et al. | |
| 10,108,932 B2 | 10/2018 | Sung et al. | |
| 10,115,038 B2 | 10/2018 | Hazur et al. | |
| 10,147,460 B2 | 12/2018 | Ullrich | |
| 10,152,695 B1 | 12/2018 | Chiu et al. | |
| 10,152,696 B2 | 12/2018 | Thankappan et al. | |
| 10,168,866 B2 | 1/2019 | Wakeen et al. | |
| 10,178,427 B2 | 1/2019 | Huang | |
| 10,235,008 B2 | 3/2019 | Lee et al. | |

(56) References Cited

U.S. PATENT DOCUMENTS

| | | |
|---|---|---|
| 10,242,345 B2 | 3/2019 | Taylor et al. |
| 10,268,736 B1 | 4/2019 | Balasia et al. |
| 10,296,873 B1 | 5/2019 | Balasia et al. |
| 10,310,361 B1 | 6/2019 | Featherstone |
| 10,318,927 B2 | 6/2019 | Champaneria |
| 10,325,243 B1 | 6/2019 | Ross et al. |
| 10,325,517 B2 | 6/2019 | Nielson et al. |
| 10,331,764 B2 | 6/2019 | Rao et al. |
| 10,346,805 B2 | 7/2019 | Taylor et al. |
| 10,346,928 B2 | 7/2019 | Li et al. |
| 10,353,720 B1 | 7/2019 | Wich-Vila |
| 10,433,030 B2 | 10/2019 | Packard et al. |
| 10,438,135 B2 | 10/2019 | Larsen et al. |
| 10,489,439 B2 | 11/2019 | Calapodescu et al. |
| 10,607,188 B2 | 3/2020 | Kyllonen et al. |
| 10,657,498 B2 | 5/2020 | Dey et al. |
| 10,694,097 B1 | 6/2020 | Shirakyan |
| 10,728,443 B1 | 7/2020 | Olshansky |
| 10,735,396 B2 | 8/2020 | Krstic et al. |
| 10,748,118 B2 | 8/2020 | Fang |
| 10,796,217 B2 | 10/2020 | Wu |
| 10,963,841 B2 | 3/2021 | Olshansky |
| 11,023,735 B1 | 6/2021 | Olshansky |
| 11,127,232 B2 | 9/2021 | Olshansky |
| 11,144,882 B1 | 10/2021 | Olshansky |
| 11,727,040 B2 | 8/2023 | Olshansky |
| 2001/0001160 A1 | 5/2001 | Shoff et al. |
| 2001/0038746 A1 | 11/2001 | Hughes et al. |
| 2002/0097984 A1 | 7/2002 | Abecassis |
| 2002/0113879 A1 | 8/2002 | Battle et al. |
| 2002/0122659 A1 | 9/2002 | McGrath et al. |
| 2002/0191071 A1 | 12/2002 | Rui et al. |
| 2003/0005429 A1 | 1/2003 | Colsey |
| 2003/0027611 A1 | 2/2003 | Recard |
| 2003/0189589 A1 | 10/2003 | LeBlanc et al. |
| 2003/0194211 A1 | 10/2003 | Abecassis |
| 2003/0233345 A1* | 12/2003 | Perisic ............... G06F 16/9535 707/999.003 |
| 2004/0033061 A1 | 2/2004 | Hughes et al. |
| 2004/0186743 A1 | 9/2004 | Cordero |
| 2004/0264919 A1 | 12/2004 | Taylor et al. |
| 2005/0095569 A1 | 5/2005 | Franklin |
| 2005/0137896 A1 | 6/2005 | Pentecost et al. |
| 2005/0187765 A1 | 8/2005 | Kim et al. |
| 2005/0232462 A1 | 10/2005 | Vallone et al. |
| 2005/0235033 A1 | 10/2005 | Doherty |
| 2005/0271251 A1 | 12/2005 | Russell et al. |
| 2006/0042483 A1 | 3/2006 | Work et al. |
| 2006/0045179 A1 | 3/2006 | Mizuno et al. |
| 2006/0100919 A1 | 5/2006 | Levine |
| 2006/0116555 A1 | 6/2006 | Pavlidis et al. |
| 2006/0229896 A1 | 10/2006 | Rosen et al. |
| 2007/0088601 A1 | 4/2007 | Money et al. |
| 2007/0124161 A1 | 5/2007 | Mueller et al. |
| 2007/0237502 A1 | 10/2007 | Ryckman et al. |
| 2007/0288245 A1 | 12/2007 | Benjamin |
| 2008/0086504 A1 | 4/2008 | Sanders et al. |
| 2009/0083103 A1 | 3/2009 | Basser |
| 2009/0083670 A1 | 3/2009 | Roos |
| 2009/0087161 A1 | 4/2009 | Roberts et al. |
| 2009/0144785 A1 | 6/2009 | Walker et al. |
| 2009/0171899 A1 | 7/2009 | Chittoor et al. |
| 2009/0192884 A1* | 7/2009 | Lo ..................... G06Q 10/10 707/E17.014 |
| 2009/0248685 A1 | 10/2009 | Pasqualoni et al. |
| 2009/0258334 A1 | 10/2009 | Pyne |
| 2010/0086283 A1 | 4/2010 | Ramachandran et al. |
| 2010/0143329 A1 | 6/2010 | Larsen |
| 2010/0183280 A1 | 7/2010 | Beauregard et al. |
| 2010/0191561 A1 | 7/2010 | Jeng et al. |
| 2010/0199228 A1 | 8/2010 | Latta et al. |
| 2010/0217757 A1* | 8/2010 | Fujioka ............... G06F 16/9535 707/710 |
| 2010/0223109 A1 | 9/2010 | Hawn et al. |
| 2010/0325307 A1 | 12/2010 | Roos |
| 2011/0055098 A1 | 3/2011 | Stewart |
| 2011/0055930 A1 | 3/2011 | Flake et al. |
| 2011/0060671 A1 | 3/2011 | Erbey et al. |
| 2011/0076656 A1 | 3/2011 | Scott et al. |
| 2011/0088081 A1 | 4/2011 | Folkesson et al. |
| 2011/0119264 A1* | 5/2011 | Hu ..................... G06Q 10/00 707/E17.079 |
| 2011/0135279 A1 | 6/2011 | Leonard |
| 2011/0191416 A1* | 8/2011 | Glazer ............... G06Q 10/06 726/28 |
| 2012/0036127 A1 | 2/2012 | Work et al. |
| 2012/0053996 A1 | 3/2012 | Galbavy |
| 2012/0084649 A1 | 4/2012 | Dowdell et al. |
| 2012/0114246 A1 | 5/2012 | Weitzman |
| 2012/0130771 A1 | 5/2012 | Kannan et al. |
| 2012/0257875 A1 | 10/2012 | Sharpe et al. |
| 2012/0271774 A1 | 10/2012 | Clegg |
| 2013/0007670 A1 | 1/2013 | Roos |
| 2013/0016815 A1 | 1/2013 | Odinak et al. |
| 2013/0016816 A1 | 1/2013 | Odinak et al. |
| 2013/0016823 A1 | 1/2013 | Odinak et al. |
| 2013/0024105 A1 | 1/2013 | Thomas |
| 2013/0111401 A1 | 5/2013 | Newman et al. |
| 2013/0121668 A1 | 5/2013 | Meaney et al. |
| 2013/0124998 A1 | 5/2013 | Pendergast et al. |
| 2013/0124999 A1 | 5/2013 | Agnoli et al. |
| 2013/0125000 A1 | 5/2013 | Fleischhauer et al. |
| 2013/0177296 A1 | 7/2013 | Geisner et al. |
| 2013/0212033 A1 | 8/2013 | Work et al. |
| 2013/0212180 A1 | 8/2013 | Work et al. |
| 2013/0216206 A1 | 8/2013 | Dubin et al. |
| 2013/0218688 A1 | 8/2013 | Roos |
| 2013/0222601 A1 | 8/2013 | Engstroem et al. |
| 2013/0226578 A1 | 8/2013 | Bolton et al. |
| 2013/0226674 A1 | 8/2013 | Field et al. |
| 2013/0226910 A1 | 8/2013 | Work et al. |
| 2013/0254192 A1 | 9/2013 | Work et al. |
| 2013/0259447 A1 | 10/2013 | Sathish et al. |
| 2013/0266925 A1 | 10/2013 | Nunamaker et al. |
| 2013/0268452 A1 | 10/2013 | MacEwen et al. |
| 2013/0283378 A1 | 10/2013 | Costigan et al. |
| 2013/0290210 A1 | 10/2013 | Cline et al. |
| 2013/0290325 A1 | 10/2013 | Work et al. |
| 2013/0290420 A1 | 10/2013 | Work et al. |
| 2013/0290448 A1 | 10/2013 | Work et al. |
| 2013/0297589 A1 | 11/2013 | Work et al. |
| 2013/0332381 A1 | 12/2013 | Clark et al. |
| 2013/0332382 A1 | 12/2013 | LaPasta et al. |
| 2014/0036023 A1 | 2/2014 | Croen et al. |
| 2014/0089217 A1 | 3/2014 | McGovern et al. |
| 2014/0092254 A1 | 4/2014 | Mughal et al. |
| 2014/0123177 A1 | 5/2014 | Kim et al. |
| 2014/0125703 A1 | 5/2014 | Roveta et al. |
| 2014/0143165 A1 | 5/2014 | Posse et al. |
| 2014/0153902 A1 | 6/2014 | Pearson et al. |
| 2014/0186004 A1 | 7/2014 | Hamer |
| 2014/0191939 A1 | 7/2014 | Penn et al. |
| 2014/0192200 A1 | 7/2014 | Zagron |
| 2014/0198196 A1 | 7/2014 | Howard et al. |
| 2014/0214709 A1 | 7/2014 | Greaney |
| 2014/0245146 A1 | 8/2014 | Roos |
| 2014/0258288 A1 | 9/2014 | Work et al. |
| 2014/0270706 A1 | 9/2014 | Pasko |
| 2014/0278506 A1 | 9/2014 | Rogers et al. |
| 2014/0278683 A1 | 9/2014 | Kennell et al. |
| 2014/0279634 A1 | 9/2014 | Seeker |
| 2014/0282079 A1 | 9/2014 | Hardy et al. |
| 2014/0317009 A1 | 10/2014 | Bilodeau et al. |
| 2014/0317079 A1* | 10/2014 | Obernikhin ......... G06F 16/2468 707/706 |
| 2014/0317126 A1 | 10/2014 | Work et al. |
| 2014/0325359 A1 | 10/2014 | Vehovsky et al. |
| 2014/0325373 A1 | 10/2014 | Kramer et al. |
| 2014/0327779 A1 | 11/2014 | Eronen et al. |
| 2014/0330734 A1 | 11/2014 | Sung et al. |
| 2014/0330773 A1* | 11/2014 | Brillhart ............ G06F 16/24578 707/609 |
| 2014/0336942 A1 | 11/2014 | Pe'er et al. |
| 2014/0337900 A1 | 11/2014 | Hurley |

(56) References Cited

U.S. PATENT DOCUMENTS

| | | |
|---|---|---|
| 2014/0356822 A1 | 12/2014 | Hoque et al. |
| 2014/0358810 A1 | 12/2014 | Hardtke et al. |
| 2014/0359439 A1 | 12/2014 | Lyren |
| 2015/0003603 A1 | 1/2015 | Odinak et al. |
| 2015/0003605 A1 | 1/2015 | Odinak et al. |
| 2015/0006422 A1 | 1/2015 | Carter et al. |
| 2015/0012453 A1 | 1/2015 | Odinak et al. |
| 2015/0046357 A1 | 2/2015 | Danson et al. |
| 2015/0063775 A1 | 3/2015 | Nakamura et al. |
| 2015/0067723 A1 | 3/2015 | Bloch et al. |
| 2015/0099255 A1 | 4/2015 | Aslan et al. |
| 2015/0100702 A1 | 4/2015 | Krishna et al. |
| 2015/0127565 A1 | 5/2015 | Chevalier et al. |
| 2015/0139601 A1 | 5/2015 | Mate et al. |
| 2015/0154564 A1 | 6/2015 | Moon et al. |
| 2015/0155001 A1 | 6/2015 | Kikugawa et al. |
| 2015/0170303 A1 | 6/2015 | Geritz et al. |
| 2015/0201134 A1 | 7/2015 | Carr et al. |
| 2015/0205800 A1 | 7/2015 | Work et al. |
| 2015/0205872 A1 | 7/2015 | Work et al. |
| 2015/0206102 A1 | 7/2015 | Cama et al. |
| 2015/0222815 A1 | 8/2015 | Wang et al. |
| 2015/0228306 A1 | 8/2015 | Roberts et al. |
| 2015/0242707 A1 | 8/2015 | Wilf et al. |
| 2015/0251099 A1* | 9/2015 | Soules .................. G06Q 50/10 463/9 |
| 2015/0269165 A1 | 9/2015 | Work et al. |
| 2015/0269529 A1 | 9/2015 | Kyllonen et al. |
| 2015/0269530 A1 | 9/2015 | Work et al. |
| 2015/0271289 A1 | 9/2015 | Work et al. |
| 2015/0278223 A1 | 10/2015 | Work et al. |
| 2015/0278290 A1 | 10/2015 | Work et al. |
| 2015/0278964 A1 | 10/2015 | Work et al. |
| 2015/0324698 A1 | 11/2015 | Karaoguz et al. |
| 2015/0339939 A1 | 11/2015 | Gustafson et al. |
| 2015/0356512 A1 | 12/2015 | Bradley |
| 2015/0380052 A1 | 12/2015 | Hamer |
| 2016/0005029 A1 | 1/2016 | Ivey et al. |
| 2016/0036976 A1 | 2/2016 | Odinak et al. |
| 2016/0104096 A1 | 4/2016 | Ovick et al. |
| 2016/0116827 A1 | 4/2016 | Tarres Bolos |
| 2016/0117942 A1 | 4/2016 | Marino et al. |
| 2016/0139562 A1 | 5/2016 | Crowder et al. |
| 2016/0154883 A1 | 6/2016 | Boerner |
| 2016/0155475 A1 | 6/2016 | Hamer |
| 2016/0180234 A1 | 6/2016 | Siebach et al. |
| 2016/0180883 A1 | 6/2016 | Hamer |
| 2016/0219264 A1 | 7/2016 | Delvaux et al. |
| 2016/0225409 A1 | 8/2016 | Eris |
| 2016/0225410 A1 | 8/2016 | Lee et al. |
| 2016/0247537 A1 | 8/2016 | Ricciardi |
| 2016/0267436 A1 | 9/2016 | Silber et al. |
| 2016/0313892 A1 | 10/2016 | Roos |
| 2016/0323608 A1 | 11/2016 | Bloch et al. |
| 2016/0330398 A1 | 11/2016 | Recchia et al. |
| 2016/0364692 A1 | 12/2016 | Bhaskaran et al. |
| 2017/0026667 A1 | 1/2017 | Pasko |
| 2017/0039525 A1 | 2/2017 | Seidle et al. |
| 2017/0076751 A9 | 3/2017 | Hamer |
| 2017/0134776 A1 | 5/2017 | Ranjeet et al. |
| 2017/0164013 A1 | 6/2017 | Abramov et al. |
| 2017/0164014 A1 | 6/2017 | Abramov et al. |
| 2017/0164015 A1 | 6/2017 | Abramov et al. |
| 2017/0171602 A1 | 6/2017 | Qu |
| 2017/0178688 A1 | 6/2017 | Ricciardi |
| 2017/0195491 A1 | 7/2017 | Odinak et al. |
| 2017/0206504 A1 | 7/2017 | Taylor et al. |
| 2017/0213190 A1 | 7/2017 | Hazan |
| 2017/0213573 A1 | 7/2017 | Takeshita et al. |
| 2017/0227353 A1 | 8/2017 | Brunner |
| 2017/0236073 A1 | 8/2017 | Borisyuk et al. |
| 2017/0244894 A1 | 8/2017 | Aggarwal et al. |
| 2017/0244984 A1 | 8/2017 | Aggarwal et al. |
| 2017/0244991 A1 | 8/2017 | Aggarwal et al. |
| 2017/0262706 A1 | 9/2017 | Sun et al. |
| 2017/0264958 A1 | 9/2017 | Hutten |
| 2017/0293413 A1 | 10/2017 | Matsushita et al. |
| 2017/0316806 A1 | 11/2017 | Warren et al. |
| 2017/0332044 A1 | 11/2017 | Marlow et al. |
| 2017/0353769 A1 | 12/2017 | Husain et al. |
| 2017/0372748 A1 | 12/2017 | McCauley et al. |
| 2018/0011621 A1 | 1/2018 | Roos |
| 2018/0025303 A1 | 1/2018 | Janz |
| 2018/0054641 A1 | 2/2018 | Hall et al. |
| 2018/0070045 A1 | 3/2018 | Holmes |
| 2018/0074681 A1 | 3/2018 | Roos |
| 2018/0082238 A1 | 3/2018 | Shani |
| 2018/0096307 A1 | 4/2018 | Fortier et al. |
| 2018/0109737 A1 | 4/2018 | Nakamura et al. |
| 2018/0109826 A1 | 4/2018 | McCoy et al. |
| 2018/0110460 A1 | 4/2018 | Danson et al. |
| 2018/0114154 A1 | 4/2018 | Bae |
| 2018/0130497 A1 | 5/2018 | McCauley et al. |
| 2018/0132014 A1 | 5/2018 | Khazanov et al. |
| 2018/0150604 A1 | 5/2018 | Arena et al. |
| 2018/0158027 A1 | 6/2018 | Venigalla |
| 2018/0182436 A1 | 6/2018 | Ullrich |
| 2018/0191955 A1 | 7/2018 | Aoki et al. |
| 2018/0218238 A1 | 8/2018 | Viirre et al. |
| 2018/0226102 A1 | 8/2018 | Roberts et al. |
| 2018/0227501 A1 | 8/2018 | King |
| 2018/0232751 A1 | 8/2018 | Terhark et al. |
| 2018/0247271 A1 | 8/2018 | Van Hoang et al. |
| 2018/0253697 A1 | 9/2018 | Sung et al. |
| 2018/0268868 A1 | 9/2018 | Salokannel et al. |
| 2018/0270613 A1 | 9/2018 | Park |
| 2018/0302680 A1 | 10/2018 | Cormican |
| 2018/0308521 A1 | 10/2018 | Iwamoto |
| 2018/0316947 A1 | 11/2018 | Todd |
| 2018/0336528 A1 | 11/2018 | Carpenter et al. |
| 2018/0336930 A1 | 11/2018 | Takahashi |
| 2018/0350405 A1 | 12/2018 | Marco et al. |
| 2018/0353769 A1 | 12/2018 | Smith et al. |
| 2018/0374251 A1 | 12/2018 | Mitchell et al. |
| 2018/0376225 A1 | 12/2018 | Jones et al. |
| 2019/0005373 A1 | 1/2019 | Nims et al. |
| 2019/0019157 A1 | 1/2019 | Saha et al. |
| 2019/0057356 A1 | 2/2019 | Larsen et al. |
| 2019/0087558 A1 | 3/2019 | Mercury et al. |
| 2019/0096307 A1 | 3/2019 | Liang et al. |
| 2019/0129964 A1* | 5/2019 | Corbin, II ............. G06F 16/337 |
| 2019/0141033 A1 | 5/2019 | Kaafar et al. |
| 2019/0220824 A1 | 7/2019 | Liu |
| 2019/0244176 A1 | 8/2019 | Chuang et al. |
| 2019/0259002 A1 | 8/2019 | Balasia et al. |
| 2019/0295040 A1 | 9/2019 | Clines |
| 2019/0311488 A1 | 10/2019 | Sareen |
| 2019/0325064 A1 | 10/2019 | Mathiesen et al. |
| 2020/0012350 A1 | 1/2020 | Tay |
| 2020/0110786 A1 | 4/2020 | Kim |
| 2020/0126545 A1 | 4/2020 | Kakkar et al. |
| 2020/0143329 A1 | 5/2020 | Gamaliel |
| 2020/0311163 A1 | 10/2020 | Ma et al. |
| 2020/0311682 A1 | 10/2020 | Olshansky |
| 2020/0311953 A1 | 10/2020 | Olshansky |
| 2020/0396376 A1 | 12/2020 | Olshansky |
| 2021/0035047 A1 | 2/2021 | Mossoba et al. |
| 2021/0158663 A1 | 5/2021 | Buchholz et al. |
| 2021/0174308 A1 | 6/2021 | Olshansky |
| 2021/0233262 A1 | 7/2021 | Olshansky |
| 2021/0312184 A1 | 10/2021 | Olshansky |
| 2021/0314521 A1 | 10/2021 | Olshansky |
| 2023/0039116 A1 | 2/2023 | Olshansky |

FOREIGN PATENT DOCUMENTS

| | | |
|---|---|---|
| CA | 2206105 | 12/2000 |
| CA | 2763634 | 12/2012 |
| CN | 109146430 | 1/2019 |
| EP | 1376584 | 1/2004 |
| EP | 1566748 | 8/2005 |
| EP | 1775949 | 12/2007 |
| EP | 1954041 | 8/2008 |
| JP | 2009258175 | 11/2009 |

(56) References Cited

FOREIGN PATENT DOCUMENTS

| | | |
|---|---|---|
| JP | 2019016192 | 1/2019 |
| WO | 9703366 | 1/1997 |
| WO | 9713366 | 4/1997 |
| WO | 9713367 | 4/1997 |
| WO | 9828908 | 7/1998 |
| WO | 9841978 | 9/1998 |
| WO | 9905865 | 2/1999 |
| WO | 0133421 | 5/2001 |
| WO | 0117250 | 9/2002 |
| WO | 03003725 | 1/2003 |
| WO | 2004062563 | 7/2004 |
| WO | 2005114377 | 12/2005 |
| WO | 2006103578 | 10/2006 |
| WO | 2006129496 | 12/2006 |
| WO | 2007039994 | 4/2007 |
| WO | 2007097218 | 8/2007 |
| WO | 2008029803 | 3/2008 |
| WO | 2008039407 | 4/2008 |
| WO | 2009042858 | 4/2009 |
| WO | 2009042900 | 4/2009 |
| WO | 2009075190 | 6/2009 |
| WO | 2009116955 | 9/2009 |
| WO | 2009157446 | 12/2009 |
| WO | 2010055624 | 5/2010 |
| WO | 2010116998 | 10/2010 |
| WO | 2011001180 | 1/2011 |
| WO | 2011007011 | 1/2011 |
| WO | 2011035419 | 3/2011 |
| WO | 2011129578 | 10/2011 |
| WO | 2011136571 | 11/2011 |
| WO | 2012002896 | 1/2012 |
| WO | 2012068433 | 5/2012 |
| WO | 2012039959 | 6/2012 |
| WO | 2012089855 | 7/2012 |
| WO | 2013026095 | 2/2013 |
| WO | 2013039351 | 3/2013 |
| WO | 2013074207 | 5/2013 |
| WO | 2013088208 | 6/2013 |
| WO | 2013093176 | 6/2013 |
| WO | 2013131134 | 9/2013 |
| WO | 2013165923 | 11/2013 |
| WO | 2014089362 | 6/2014 |
| WO | 2014093668 | 6/2014 |
| WO | 2014152021 | 9/2014 |
| WO | 2014163283 | 10/2014 |
| WO | 2014164549 | 10/2014 |
| WO | 2015031946 | 4/2015 |
| WO | 2015071490 | 5/2015 |
| WO | 2015109290 | 7/2015 |
| WO | 2016031431 | 3/2016 |
| WO | 2016053522 | 4/2016 |
| WO | 2016073206 | 5/2016 |
| WO | 2016123057 | 8/2016 |
| WO | 2016138121 | 9/2016 |
| WO | 2016138161 | 9/2016 |
| WO | 2016186798 | 11/2016 |
| WO | 2016189348 | 12/2016 |
| WO | 2017022641 | 2/2017 |
| WO | 2017042831 | 3/2017 |
| WO | 2017049612 | 3/2017 |
| WO | 2017051063 | 3/2017 |
| WO | 2017096271 | 6/2017 |
| WO | 2017130810 | 8/2017 |
| WO | 2017150772 | 9/2017 |
| WO | 2017192125 | 11/2017 |
| WO | 2018042175 | 3/2018 |
| WO | 2018094443 | 5/2018 |
| WO | 2020198230 | 10/2020 |
| WO | 2020198240 | 10/2020 |
| WO | 2020198363 | 10/2020 |
| WO | 2021108564 | 6/2021 |
| WO | 2021202293 | 10/2021 |
| WO | 2021202300 | 10/2021 |

OTHER PUBLICATIONS

"American Express Frequently Asked Question: Why were Membership Rewards points forfeited and how can I reinstate them?," https://www.americanexpress.com/us/customer-service/faq.membership-rewards-points-forfeiture.html, 2 pages.

"DaXtra Parser (CVX) Technical Specifications," DaXtra Parser Spec. available at URL: <https://cvxdemo.daxtra.com/cvx/download/Parser%20Technical%20Specifications.pdf> at least as early as Feb. 25, 2021 (3 pages).

File History for U.S. Appl. No. 16/366,746 downloaded Sep. 7, 2021 (353 pages).

File History for U.S. Appl. No. 16/828,578 downloaded Sep. 7, 2021 (353 pages).

File History for U.S. Appl. No. 16/366,703 downloaded Sep. 7, 2021 (727 pages).

File History for U.S. Appl. No. 17/212,688 downloaded Sep. 7, 2021 (311 pages).

File History for U.S. Appl. No. 16/696,781 downloaded Oct. 1, 2021 (434 pages).

File History for U.S. Appl. No. 17/025,902 downloaded Oct. 1, 2021 (367 pages).

File History for U.S. Appl. No. 16/931,964 downloaded Sep. 7, 2021 (259 pages).

"International Preliminary Report on Patentability," for PCT Application No. PCT/US2020/024470 dated Oct. 7, 2021 (9 pages).

"International Preliminary Report on Patentability," for PCT Application No. PCT/US2020/024488 dated Oct. 7, 2021 (9 pages).

"International Preliminary Report on Patentability," for PCT Application No. PCT/US2020/024722 dated Oct. 7, 2021 (8 pages).

"International Search Report and Written Opinion," for PCT Application No. PCT/US2020/024470 dated Jul. 9, 2020 (13 pages).

"International Search Report and Written Opinion," for PCT Application No. PCT/US2020/024488 dated May 19, 2020 (14 pages).

"International Search Report and Written Opinion," for PCT Application No. PCT/US2020/024722 dated Jul. 10, 2020 (13 pages).

"International Search Report and Written Opinion," for PCT Application No. PCT/US2020/062246 dated Apr. 1, 2021 (18 pages).

"International Search Report and Written Opinion," for PCT Application No. PCT/US2021/024423 dated Jun. 16, 2021 (13 pages).

"International Search Report and Written Opinion," for PCT Application No. PCT/US2021/024450 dated Jun. 4, 2021 (14 pages).

"Invitation to Pay Additional Fees," for PCT Application No. PCT/US2020/062246 dated Feb. 11, 2021 (14 pages).

"Non-Final Office Action," for U.S. Appl. No. 16/910,986 dated Jun. 23, 2021 (70 pages).

"Nurse Resumes," Post Job Free Resume Search Results for "nurse" available at URL <https://www.postjobfree.com/resumes?q=nurse&l=&radius=25> at least as early as Jan. 26, 2021 (2 pages).

"Nurse," LiveCareer Resume Search results available online at URL <https://www.livecareer.com/resume-search/search?jt=nurse> website published as early as Dec. 21, 2017 (4 pages).

"Response to Non Final Office Action," for U.S. Appl. No. 16/910,986, filed Sep. 30, 2021 (18 pages).

"Resume Database," Mighty Recruiter Resume Database available online at URL <https://www.mightyrecruiter.com/features/resume-database> at least as early as Sep. 4, 2017 (6 pages).

"Resume Library," Online job board available at Resume-library.com at least as early as Aug. 6, 2019 (6 pages).

"Television Studio," Wikipedia, Published Mar. 8, 2019 and retrieved May 27, 2021 from URL <https://en.wikipedia.org/w/index/php?title=Television_studio&oldid=886710983> (3 pages).

"Understanding Multi-Dimensionality in Vector Space Modeling," Pythonic Excursions article published Apr. 16, 2019, accessible at URL <https://aegis4048.github.io/understanding_multi-dimensionality_in_vector_space_modeling> (29 pages).

Advantage Video Systems "Jeffrey Stansfield of AVS interviews rep about Air-Hush products at the 2019 NAMM Expo," YouTube video, available at https://www.youtube.com/watch?v=nWzrM99qk_o, accessed Jan. 17, 2021.

Alley, E. "Professional Autonomy in Video Relay Service Interpreting: Perceptions of American Sign Language-English Interpret-

(56) References Cited

OTHER PUBLICATIONS ers," (Order No. 10304259). Available from ProQuest Dissertations and Theses Professional. (Year: 2016), 209 pages.

Bishop, Todd "Microsoft patents tech to score meetings using body language, facial expressions, other data," Article published Nov. 28, 2020 at URL <https://www.geekwire.com/author/todd/> (7 pages).

Brocardo, Marcelo Luiz, et al. "Verifying Online User Identity using Stylometric Analysis for Short Messages," Journal of Networks, vol. 9, No. 12, Dec. 2014, pp. 3347-3355.

Hughes, K. "Corporate Channels: How American Business and Industry Made Television Useful," (Order No. 10186420). Available from ProQuest Dissertations and Theses Professional. (Year: 2015), 499 pages.

Jakubowski, Kelly, et al. "Extracting Coarse Body Movements from Video in Music Performance: A Comparison of Automated Computer Vision Techniques with Motion Capture Data," Front. Digit. Humanit. 2017, 4:9 (8 pages).

Johnston, A. M, et al. "A Mediated Discourse Analysis of Immigration Gatekeeping Interviews," (Order No. 3093235). Available from ProQuest Dissertations and Theses Professional (Year: 2003), 262 pages.

Lai, Kenneth, et al."Decision Support for Video-based Detection of Flu Symptoms," Biometric Technologies Laboratory, Department of Electrical and Computer Engineering, University of Calgary, Canada, Aug. 24, 2020 available at URL <https://ucalgary.ca/labs/biometric-technologies/publications> (8 pages).

Liu, Weihua, et al. "RGBD Video Based Human Hand Trajectory Tracking and Gesture Recognition System," Mathematical Problems in Engineering vol. 2015, article ID 863732 (16 pages).

Luenendonk, Martin "The Secrets to Interviewing for a Role That's Slightly Out of Reach," Cleverism Article available at URL <https://www.cleverism.com/interviewing-for-a-role-thats-slightly-out-of-reach/> last updated Sep. 25, 2019 (13 pages).

Pentland, S. J. "Human-Analytics in Information Systems Research and Applications in Personnel Selection," (Order No. 10829600). Available from ProQuest Dissertations and Theses Professional. (Year: 2018), 158 pages.

Ramanarayanan, Vikram, et al. "Evaluating Speech, Face, Emotion and Body Movement Time-series Features for Automated Multimodal Presentation Scoring," In Proceedings of the 2015 ACM on (ICMI 2015). Association for Computing Machinery, New York, NY, USA, 23-30 (8 pages).

Randhavane, Tanmay, et al. "Identifying Emotions from Walking Using Affective and Deep Features," Jan. 9, 2020 Article available at Cornell University website URL <https://arxiv.org/abs/1906.11884v4> (15 pages).

Swanepoel, De Wet, et al. "A Systematic Review of Telehealth Applications in Audiology," Telemedicine and e-Health 16.2 (2010): 181-200 (20 pages).

Wang, Jenny "How to Build a Resume Recommender like the Applicant Tracking System (ATS)," Towards Data Science article published Jun. 25, 2020, accessible at URL <https://towardsdatascience.com/resume-screening-tool-resume-recommendation-engine-in-a-nutshell-53fcf6e6559b> (14 pages).

Yun, Jaeseok, et al. "Human Movement Detection and Identification Using Pyroelectric Infrared Sensors," Sensors 2014, 14, 8057-8081 (25 pages).

"Non-Final Office Action," for U.S. Appl. No. 17/396,294 dated Jul. 7, 2022 (57 pages).

"Notice of Allowance," for U.S. Appl. No. 17/396,294 dated Mar. 17, 2023 (22 pages).

* cited by examiner

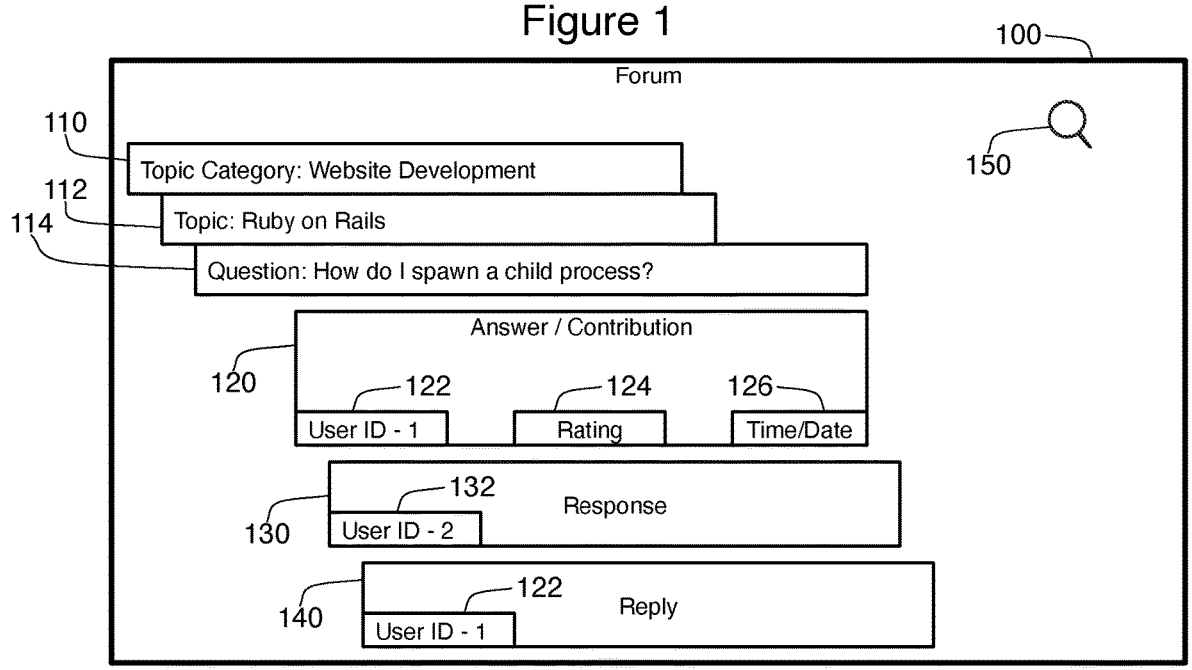
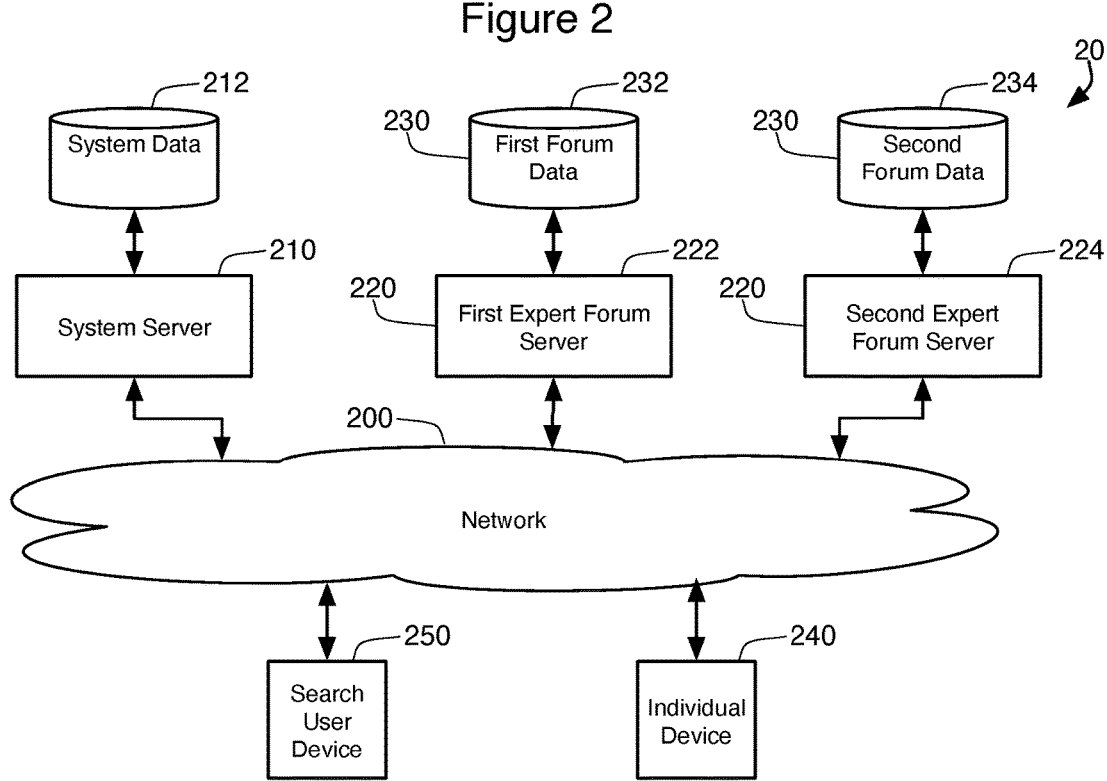

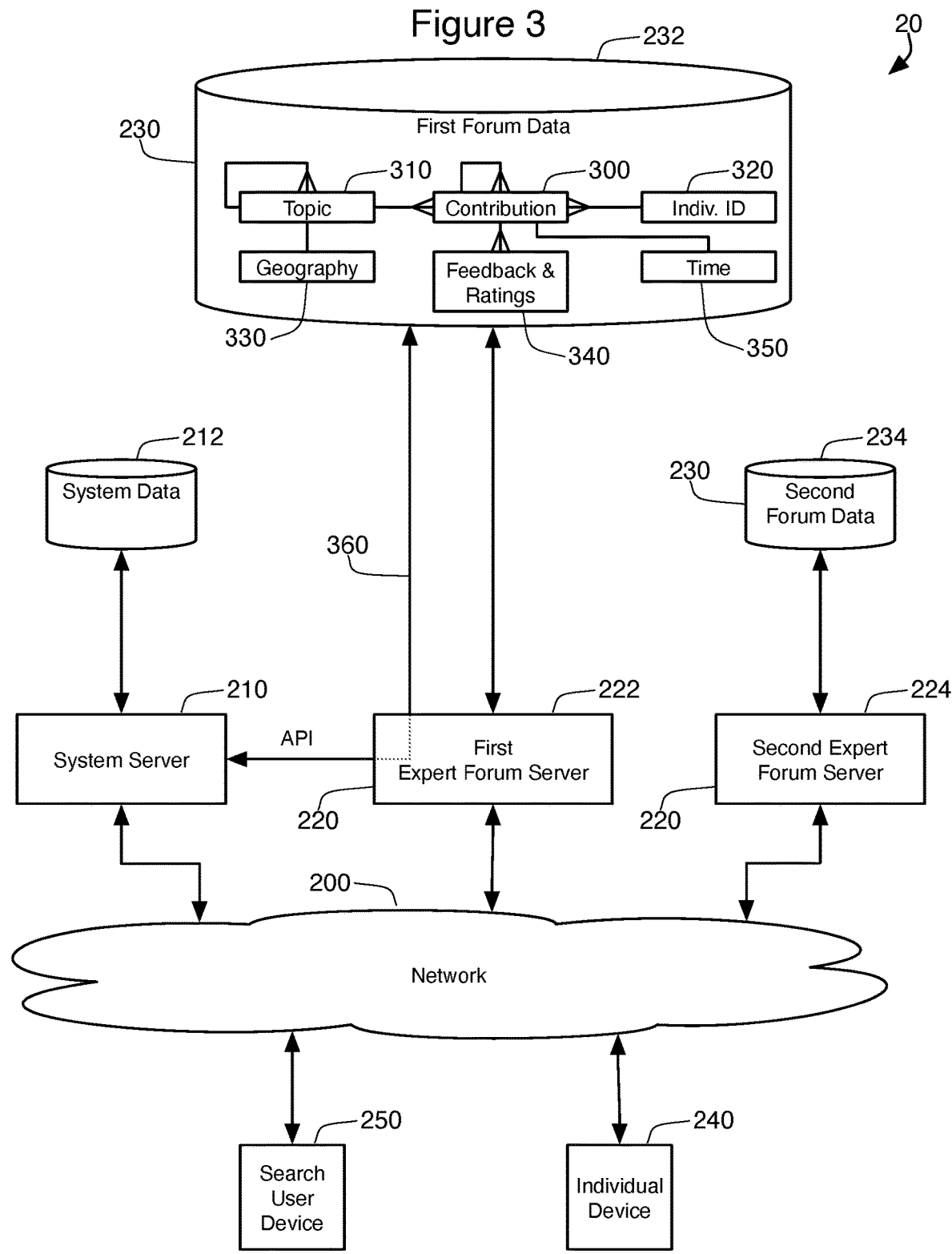

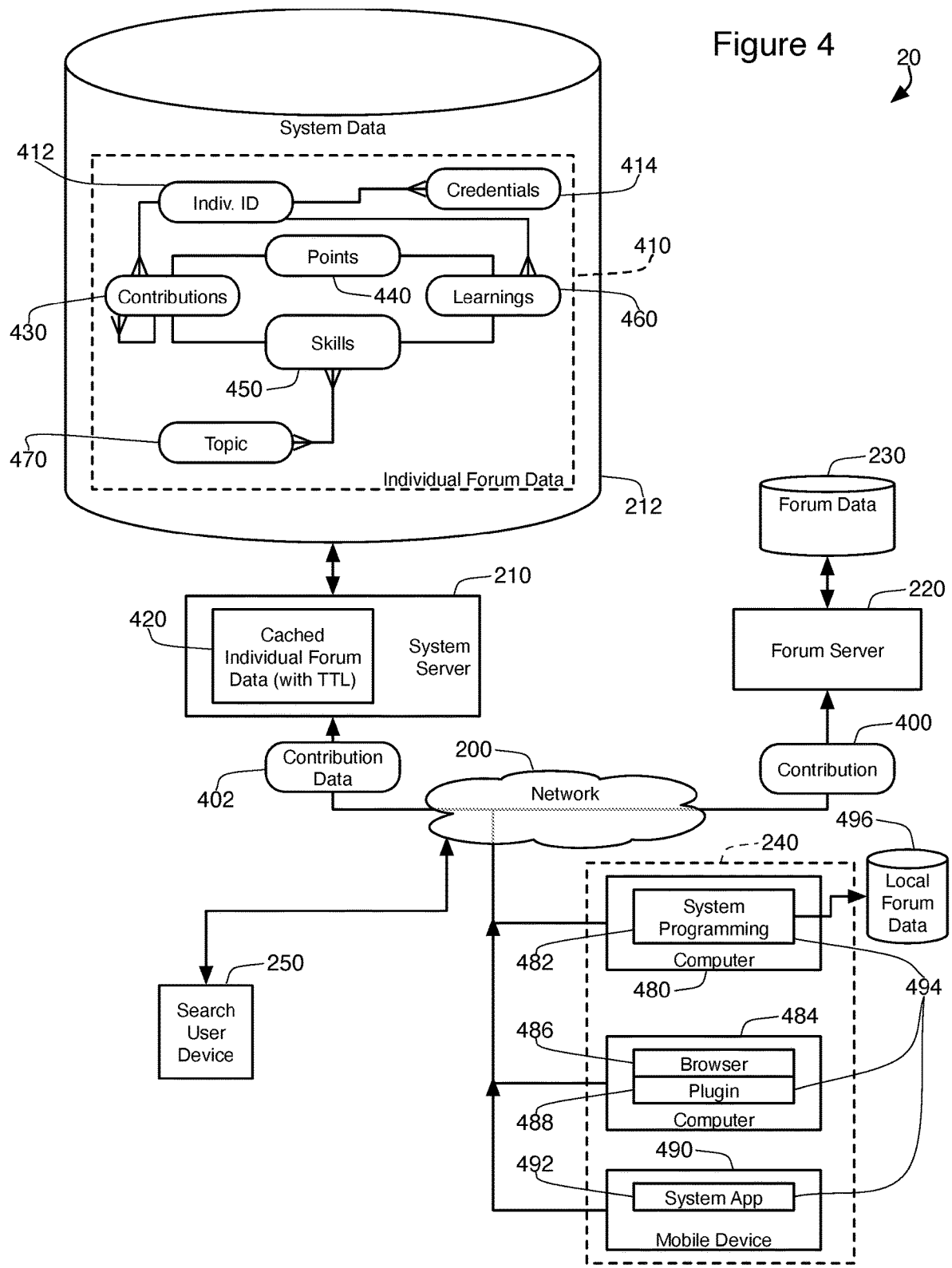

MONITORING THIRD-PARTY FORUM CONTRIBUTIONS TO IMPROVE SEARCHING THROUGH TIME-TO-LIVE DATA ASSIGNMENTS

CROSS-REFERENCE TO RELATED CASES

The present application is a continuation of U.S. patent application Ser. No. 17/396,294, filed on Aug. 6, 2021, which is hereby incorporated by reference in its entirety.

FIELD OF THE INVENTION

The present application relates to the field of data searching over a network. More particularly, the present application improves the searching of data related to individuals by improving data quality and content through the monitoring of contributions to and learnings from third-party forums and through time-to-live data assignments.

SUMMARY OF THE INVENTION

In an embodiment, a method is included. The method can include a) at a system server, accessing forum data and non-forum data that together relate to a plurality of individuals, the non-forum data associating skills with a first set of individual identifiers, b) at the system server, receiving contribution data from a system application operating on an individual computing device, the contribution data identifying a contribution made from the individual computing device to a third-party forum, c) at the system server, determining a first individual identifier associated with a first individual for the contribution data, d) at the system server, establishing within the forum data a first skill association between a contribution skill identified for the contribution and the first individual identifier, e) at the system server, establishing within the forum data a first point association between a contribution point value identified for the contribution and the first individual identifier, f) at a search server, receiving a query from a search user device to search the plurality of individuals, the query can include a search parameter, g) at the search server, identifying a query skill from the search parameter, wherein the query skill matches the contribution skill, h) at the search server, searching both the non-forum data and the forum data for individual identifiers associated with the query skill to determine search results, the search results including data related to the first individual identifier as a consequence of the contribution skill being associated with the first individual identifier, and i) at the search server, returning the search results to the search user device.

In an embodiment, the contribution data includes contribution content, and further wherein the contribution point value is identified based upon an examination of the contribution content.

In an embodiment, the contribution skill is identified for the contribution by first determining a topic under which the contribution was made, and second determining the contribution skill based on the topic.

In an embodiment, the method can further include preliminary steps of evaluating a hierarchy of a plurality of topics found at the third-party forum, and creating an association between the plurality of topics and a plurality of skills.

In an embodiment, the search server is operating on a same computer system as the system server.

In an embodiment, the data related to the first individual identifier in the search results is personally identifiable information for the first individual.

In an embodiment, the first skill association is established within the forum data by establishing associations between an individual identifier data entity and a contribution data entity and between the contribution data entity and a skill data entity.

In an embodiment, a plurality of skills are associated with the first individual identifier in the forum data.

In an embodiment, a plurality of point values are associated with the first individual identifier in the forum data.

In an embodiment, the method can further include receiving a request from the individual computing device to redeem point values associated with the first individual identifier.

In an embodiment, an avatar is associated with the first individual identifier, further wherein the search results present the avatar in conjunction with the data related to the first individual identifier, and still further wherein the request alters the avatar associated with the first individual identifier.

In an embodiment, an avatar is associated with the first individual identifier, further can include a step of creating a live video link between the individual computing device and the search user device in which the avatar represents the first individual, and still further wherein the request alters the avatar associated with the first individual identifier.

In an embodiment, the forum data includes temporary forum data and permanent forum data, further wherein the first skill association and the first point association are stored in the temporary forum data, further can include identifying a time-to-live clock expiration associated with the first individual identifier and, consequently, deleting the first skill association and the first point association from the forum data.

In an embodiment, the forum data includes temporary forum data and permanent forum data, further wherein the first skill association and the first point association are stored in the temporary forum data, further can include identifying a save event associated with the first individual identifier and, consequently, storing the first skill association and the first point association into the permanent forum data.

In an embodiment, the step of searching to determine the search results includes the save event.

In an embodiment, the save event includes an event selected from a set of events consisting of: i) utilization of the system server by the individual computing device for a determined time period, ii) accumulation of a total number of point values associated with the first individual identifier that exceeds a set threshold, and iii) interaction between the search user device and the individual computing device facilitated by the system server.

In an embodiment, the method can further include j) at the system server, receiving learning confirmation data associated with the first individual identifier from the system application operating on the individual computing device, the learning confirmation data identifying a learning received by the individual computing device, k) at the system server, determining a learning skill for the learning, l) at the system server, establishing within the forum data a second skill association between the learning skill and the first individual identifier, m) at the system server, determining a learning point value for the learning, and n) at the system server, establishing within the forum data a second point association between the learning point value and the first individual identifier.

In an embodiment, the forum data further includes temporary forum data and permanent forum data, further wherein the temporary forum data includes data relating to a second individual identifier associated with a second individual, further can include identifying a time-to-live clock expiration associated with the second individual identifier and, consequently, deleting the data relating to the second individual identifier, and still further can include, in response to a request to restore the data associated with the second individual identifier: i) at the system server, identifying credentials associated with the second individual identifier at the third-party forum, ii) at the system server and using the credentials, requesting and receiving prior contributions previously made in association with the credentials at the third-party forum, iii) at the system server, for each of the prior contributions, determining an identified skill and an identified point value, and establishing, within the permanent forum data, associations between the second individual identifier and the identified skills and the identified point values.

In an embodiment, the method can further include, before determining the identified skill and the identified point value for each of the prior contributions, verifying that the second individual authored the prior contributions.

In an embodiment, the method can further include: j) at the system server, receiving ratings for the contribution from the third-party forum, k) at the system server, altering the first skill association between the contribution skill and the first individual identifier based on the ratings.

In an embodiment, the method can further include: l) at the system server, receiving conversation data for the contribution from the third-party forum, m) at the system server, identifying relevant data in the conversation data, wherein the relevant data identifies a third individual identifier for the conversation data and further wherein the relevant data is derived from analyzing the third individual identifier and the contribution skill, n) at the system server, altering the first skill association between the contribution skill and the first individual identifier based on the relevant data.

In an embodiment, a method is included. The method can include a) at a system server, receiving first contribution data identifying a first individual identifier and a first contribution made to a first third-party forum, b) at the system server, receiving second contribution data identifying the first individual identifier and a second contribution to a second third-party forum, wherein the first third-party forum and the second third-party forum do not share forum data, c) at the system server, identifying that a contribution skill is relevant to both the first contribution data and the second contribution data, d) at the system server, establishing within forum data: i) a first contribution association between a first contribution data entity containing the first contribution data and the first individual identifier, ii) a second contribution association between a second contribution data entity containing the second contribution data and the first individual identifier, iii) a first skill association between the first contribution data entity and the contribution skill thereby establishing a first association path between the first individual identifier and the contribution skill, and iv) a second skill association between the second contribution data entity and the contribution skill thereby establishing a second association path between the first individual identifier and the contribution skill, e) at a search server, receiving a query from a search user device that identifies the contribution skill, f) at the search server, identifying a plurality of individual identifiers in response to the query including the first individual identifier, g) at the search server, sorting the plurality of individual identifiers based on a strength of association between the plurality of individual identifiers and the contribution skill, wherein the first and second association paths between the first individual identifier to the contribution skill increases the strength of association for the first individual identifier, h) at the search server, returning search results reflecting the sorted plurality of individual identifiers to the search user device.

In an embodiment, a method is included. The method can include a) at a system server, accessing temporary forum data and permanent forum data that together relate to a plurality of individuals associating skills with a first set of individual identifiers, b) at the system server, receiving first contribution data identifying a first individual identifier and a first contribution made to a third-party forum, c) at the system server, identifying a contribution skill and a contribution point value for the first contribution data, d) at the system server, establishing within the temporary forum data: i) a first skill association between the first individual identifier and the contribution skill, ii) a first point association between the first individual identifier and the contribution point value, e) at the system server, receiving a query identifying a query skill from a search user device, f) at the system server, searching both the temporary forum data and permanent forum data for individual identifiers associated with the query skill, g) at the system server, returning search results to the search user device, h) at the system server, identifying a time-to-live clock expiration associated with the first individual identifier and, as a consequence, deleting the first skill association and the first point association from the temporary forum data, i) at the system server, receiving a request to restore data associated with the first individual identifier, and in response to receiving the request: i) identifying credentials associated with the first individual identifier at the third-party forum, ii) at the system server and using the credentials, requesting and receiving prior contributions previously made in association with the credentials at the third-party forum, iii) at the system server, for each of the prior contributions, determining an identified skill and an identified point value, and establishing, within the permanent forum data, associations between the first individual identifier and the identified skills and the identified point values.

In an embodiment, the method can further include, before determining the identified skill and the identified point value for each of the prior contributions, verifying that an individual associated with the first individual identifier authored the prior contributions.

BRIEF DESCRIPTION OF THE DRAWINGS

FIG. 1 is a schematic view of a third-party forum user interface that allows for contributions on a topic.

FIG. 2 is a schematic view of a system for monitoring contributions to a forum to improve search results.

FIG. 3 is a schematic view of the system of FIG. 2 showing details of forum data.

FIG. 4 is a schematic view of the system of FIG. 2 showing details of system data and the individual device during a contribution to the third-party forum.

DETAILED DESCRIPTION

Forum Contribution Monitoring System

Figure 5:
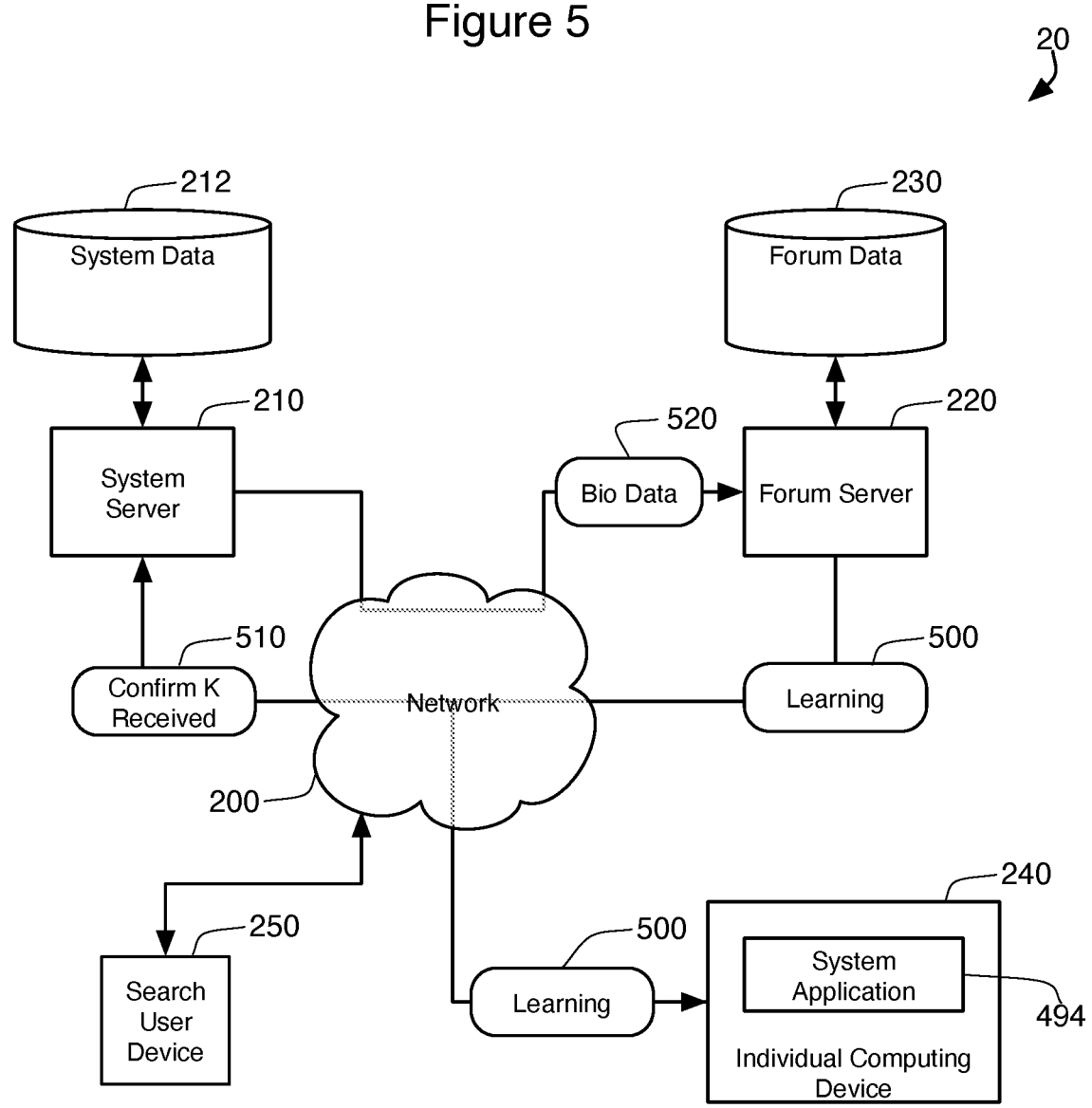
FIG. 5 is a schematic view of the system of FIG. 2 during learning from a third-party forum.

FIG. 1 shows a user interface 100 created by a third-party forum. A forum is an electronic system operating over a network in which multiple individuals can interact and communicate with the aid of a server computer. In the following description, a forum is a system that allows for the contribution of descriptive, technical information. A forum can be self-described as a forum, or may be referred to as an online community, a message board or a social media system. In most cases, however, the forum allows for contributions to be submitted and shared relevant to specific topics. A contribution can a text-based submission to the forum that contains technical information, but the contribution can also be a visual image or a video clip, or some combination of these different formats. Interface 100 may be presented to one or more individuals using a variety of techniques, including through the creation of web pages presented by browser software.

The forum interface 100 shown in FIG. 1 shows an example of an answer or contribution 120 being displayed in response to question 114. In this case, question 114 asks a technical question relating to computer programing. According to interface 100, this question 114 is part of a topic 112 related to the Ruby on Rails programming environment. This topic 112 may itself be a subtopic of a different main topic or topic category 110, such as website development. These topics 110, 112 form a hierarchy that is used to organization contributions made to the forum. Many other topics are likely maintained in this hierarchy other than the topic category 110 and topic 112 shown in FIG. 1. An individual can browse a topic hierarchy to find an area of interest, and then questions (such as question 114) can be perused to find a specific area of interest. Individuals look through the contributions 120 to gain knowledge and insight concerning the topics 110, 112. Multiple answers (such as contributions 120) may be presented to a single question 114. Most forums will also provide an ability to launch a search interface (such as by clicking icon 150) that will allow the user to search for topic categories 110, topics 112, questions 114, or contributions 120 that match their search query. In FIG. 1, the contribution 120 is an answer to a specific question 114, but contributions 120 do not always need to take the form of answers to questions. The forum shown in interface 100 is sometimes considered an "expert forum" since experts on various topics 110, 112 frequently make contributions 120 relevant to those topics 110, 112.

In interface 100, the contribution 120 is associated with a user ID 122, in this case user ID-1 122. A rating 124 is also associated with the contribution 120. This rating 124 may be based on feedback provided by other users of the forum. Such feedback can be binary (thumbs up/thumbs down) or a more detailed rating (1 to 5 stars). Typically, an algorithm (which can be as simple as an average of all ratings, or a count of positive reactions) is applied to the user feedback to develop an overall rating 124 for the contribution 120. A date and time 126 is also assigned to the contribution 120 to indicate when the contribution was submitted to the forum.

Interface 100 shows that a response 130 from another user (user ID-2 132) has been made to the first contribution 120. The author of contribution 120 (user ID-1 122) then submitted a reply contribution 140. The original contribution 120, the response 130, and the reply 140 can be considered to form a conversation since the subsidiary contributions 130, 140 all are made in response to the original contribution 120.

A contribution 120 typically involves textual content, such as a written answer to a question. However, contributions 120 are not limited to textual content, as the contribution 120 may contain images, audio data, or audio-visual content instead of or in addition to the textual content. Contributions 120 are typically viewable through interface 100 to many or all members of the forum. In some embodiments, a forum may allow for direct communication between a subset of its members, such as between only two or three members. These direct communications can also be considered contributions 120 to a forum, with responses 130 and replies 140 still being generated but being shared by only the subset of members participating in the direct communication.

Whether the contribution 120 is viewed by all members or just a subset of members, it is not necessary that the contributions 120 be in response to a particular question 114 or even a narrow topic 112. In some circumstances, the contribution 120 may take the form of providing guidance or information to new or novice users. Such "coaching" contributions 120 will likewise be considered a contribution 120 to the forum, and may take place under an overall general topic 110 for the forum.

FIG. 2 shows a system 20 for monitoring contributions to one or more third-party forums. The system 20 includes a system server 210 that monitors communications transmitted over a network 200. In particular, the system server 210 monitors communications associated with one or more forum servers 220. In FIG. 2, the forum servers 220 include a first expert forum server 222 and a second expert forum server 224. The communications being monitored generally pass between one of the forum servers 220 and an individual device 240 that is being used by an individual that makes contributions to the forum. The system server 210 can utilize custom software code operating on the individual device 240 to help monitor these communications. Through such monitoring, the system server 210 accumulates data concerning the individual using the individual device 240. The system server 210 can save this data in system data 212, although, as is explained in further detail below, some of this data can be temporarily stored outside of the system data 212. Similarly, the first expert forum server 222 stores data relating to its forum in first forum data 232, while the second expert forum server 224 stores data relating to its forum in second forum data 234. The system server 210 utilizes the data it accumulates to improve the results it generates in response to search queries from a search user device 250. In most circumstances, the search query relates to individuals, and the data accumulating by monitoring the individual using individual device 240 during interactions with the forum servers 220 improves the results generated for that query.

The system server 210, the forum servers 220, the individual device 240, and the search user device 250 shown in FIG. 2 are all computing devices. That means that each device includes a processor for processing computer programming instructions. In most cases, the processor is a CPU, such as the CPU devices created by Intel Corporation (Santa Clara, CA), Advanced Micro Devices, Inc. (Santa Clara, CA), or a RISC processor produced according to the designs of Arm Holdings PLC (Cambridge, England). Furthermore, these computing devices 210, 220, 240, 250 have memory, which generally takes the form of both temporary, random access memory (RAM) and more permanent storage such a magnetic disk storage, FLASH memory, or another non-transitory (also referred to as permanent) storage medium. The memory and storage (referred to collectively as "memory") contain both programming instructions and data. In practice, both programming and data will be stored permanently on non-transitory storage devices and transferred into RAM when needed for processing or analysis.

The data 212, 232, 234 shown in FIG. 2 is stored in separate data stores (also referred to as data or databases). These data stores 212, 232, 234 may physically be located within or as part of their controlling computing devices 210, 222, 224, respectively, or they may be located remotely from them over a local area network, a storage area network, or even a remote wide area network. If located remotely, data stores may be controlled by their own data controller computers. The data stores generally include defined database entities. These entities may constitute database tables in a relational database, or database objects in an object-oriented database, or any other type of database entity (aka "data entity") usable with a computerized database. In the present embodiment, the phrase database entity refers to data records in a database whether comprising a row in a database table, an instantiation of a database object, or any other populated database entity. Data within these data stores 212, 232, 234 can be "associated" with other data. This association can be implemented using a variety of techniques depending on the technology used to store and manage the database, such as through formal relationships in a relational database or through established relationships between objects in an object-oriented database. Furthermore, these data stores 212, 232, 234 may automatically encrypt or compress the data which they contain.

FIG. 3 also shows system 20, but FIG. 3 shows details concerning some of the data entities stored in the first forum data store 232. Similar data entities will be stored in the second forum data 234. In FIG. 3, relationships between database entities are shown using crow-foot lines to indicate the types of relationships between these entities (such as a one-to-many relationship). Not all the data stored in the first forum data 232 is shown in FIG. 3, as only details concerning the contributions are presented. Furthermore, the distinction between different entities, such as the contribution entity 300 and the individual ID entity 320, are presented for ease in understanding the data being stored and the relationship between data. It is not required that separate entities be created to exactly match the different data entities shown in this Figure or in the other Figures, as data entities can be merged or split without impacting the functionality of the overall system 20.

The data store 232 stores data about a contribution to a forum in a contribution data entity 300. This entity 300 can store the content of each contribution made through the first expert forum server 222, such as the text, image, and/or video data that might be contributed by the individual using individual device 240. In other embodiments, the contribution entity 300 does not contain the entire contribution, but only contains metadata describing the contributions. Each contribution entity 300 is associated with an individual ID data entity 320 in a one-to-many relationship, meaning that one individual (identified by the individual ID data entity 320) may make multiple contributions to a forum that are tracked in first forum data 232.

In order to simplify this discussion, a database entity such as the contribution database entity 300 or the individual ID 320 may be referred to as simply a contribution 300 or an individual ID 320 (or sometimes even as "individual 320"). In most cases, these references will refer to the data stored in the data stores 230 maintained by the third-party forum servers 220, not the abstract concept of a contribution nor an actual person who submitted the contribution. These semantics will also be true when discussing other data entities.

Each contribution 300 will be associated with a time 350 that tracks the date and time of when the contribution 300 was made to the first expert forum server 222. Each contribution 300 may also be related to one or more feedback or ratings data 340. These ratings data 340 may just be a single score or number, or may constitute a plurality of feedback inputs made by other users about a specific contribution 300. The ratings data 340 can be displayed whenever the contribution 300 is displayed by the first expert forum server 222, such as the rating 124 displayed in interface 100.

Each contribution 300 is related to a topic 310. The first expert forum server 222 will generally group contributions 300 by topic 310, and may even require that all contributions 300 be made in associated with one specific topic 310. In FIG. 1, the topic category 110, the topic 112, and the question 114 can all be considered examples of topics 310. As shown by the crow's foot link back to itself in FIG. 3, each topic 310 can be associated with other topics 310 in a parental hierarchy, which is what allows question 114 to be a child of topic 112, which itself is a child of topic category 110. It is possible and even expected that a single parent topic 310 has multiple child topics 310.

In some contexts, it is necessary for topics to be geographically limited, which is accomplished by associating the topic database entities 310 with a geography 330. For example, legal topics may be limited to a geography where a law is applicable, such as a country or a state. Medical topics can similarly be restricted to limited geographies of relevance.

The same crow's foot link that linked topic data entities 310 to other topic entities 310 is also shown linking the contribution data entity 300 with other contribution entities 300. This indicates that one contribution 300 can be made in response to another contribution 300, in the same way that response contribution 130 was made in response to answer contribution 120, and reply contribution 140 was made in reply to response contribution 130. A contribution 300 does not have to be made in response to any other contribution 300, but if it is, it is generally made in response to only a single contribution 300. Since one contribution 300 can have many responsive contributions 300 to it, this is a one-to-many link.

As shown in both FIGS. 2 and 3, the system 20 has the system server 210 as a separate computing device or system than the first expert forum server 222 and the second expert forum server 224. This is because the system server 210 is generally operated separately from the forum servers 220, usually by a different entity. The system server 210 does not have direct access to the forum data 230 of the forum servers 220. In this way, the forum servers 220 are considered to be "third-party forum servers" from the point of view of the system server 210, and the monitoring performed by the system server 210 can be considered the monitoring of third-party forums. The two forum servers 222 and 224 also do not share forum data 230 with each other, and therefore are considered two distinct third-party forums.

In some contexts, one of the forum servers 220, such as first expert forum server 222, will open up an application programming interface (or API) 360 to third parties. These types of interfaces allow unrelated systems to make data requests to the first expert forum server 222. If the request complies with the format of the API 360 and is requesting data that is authorized to be shared with the requester, the forum server 222 will acquire the requested data from its data store 232 and share it with the requester. In FIG. 3, the system server 210 has access through API link 360 to some of the first forum data 232. The system server 210 does not have API access to the data 234 of the second expert forum server 224.

Monitoring Contributions and Learnings

FIG. 4 shows system 20 with the first and second expert forum servers 222, 224 and their data 232, 234 being represented by a single forum server 220 and its forum data 230. The individual device 240 is shown in FIG. 4 as a dashed line box 240. In an actual implementation, multiple individual devices 240 may be present, with the system server 210 obtaining details about the multiple individuals using those devices 240. Inside the dashed line box 240 are three different devices 480, 484, 490, representing three example configurations for an individual device 240. These different devices 480, 484, 490 may be used by a single individual, or may be used by separate individuals all utilizing system 20.

In particular, device 480 is a standard computer such as a desktop or laptop computer. Operating on computer 480 is system programming 482. In this context, the programming 482 is considered "system" programming because it is specifically designed to communicate with the system 20. This system programming 482 allows interaction with the forum server 220 using the technology expected by that server 220. For example, if the forum server 220 is designed to provide a user interface to a web browser, the system programming 482 will be programmed to receive web interfaces and present them to the user. If the forum server 220 did not operate over standard web interfaces, the system programming 482 would be designed to interact with whatever interface is being used by the forum server 220. In addition, the system programming 482 includes additional programming to monitor interactions with the forum server 220 and to communicate with the system server 210 about those interactions.

Device 484 is also a standard computer, but this device 484 operates a standard web browser 486 such as Safari by Apple, Inc. (Cupertino, CA), Chrome by Google LLC (Mountain View, CA), or Microsoft Edge by Microsoft Corp. (Redmond, WA). These browsers allow for plug-ins, which are computer programs that interact with the standard browser. Plug-ins are generally allowed to monitor the browsing that occurs using the browser and to communicate with external systems. A system plugin 488 operates on device 484 to monitor interaction with the forum server 220 that occurs using the browser 486, and then communicate over the network 200 with the system server 210 about those interactions.

Device 490 is a mobile device, such as a smart phone or tablet computer. Operating on this device 490 is a system app 492 that operates in the same manner as system programming 482 in that it allows interaction with the forum server 220, monitors that interaction, and communicates with the system server 210.

As explained above, the system server 210 obtains data concerning the individuals that contribute to the forum server 220 in order to improve search results for users of the search user device 250. One way that it accomplishes this is by tracking all contributions, such as contribution 400, that is made by an individual device 240 to the forum server 220.

The contribution 400 is shown in FIG. 4 on an arrow coming from the individual devices 240 and going to the forum server 220. The system programming 482, or plugin 488, or app 492 (generically referred to as the system application 494) detects the contribution 400 being submitted to the forum server 220, identifies the relevant data in the contribution 400, and forwards this data as contribution data 402 to the system server 210. Note that the contribution data 402 need not be an exact digital copy of the contribution 400 that is sent to the forum server 220—it need only contain the relevant information needed by the system server 210 and this information can be reformatted to match any format desired by the system server 210. The contribution data 402 generally includes an identifier for the individual using the device 240. The contribution data 402 will also identify the topics associated with that contribution 400. Thus, if contribution 400 were the contribution 120 in FIG. 1, the contribution data 402 would identify the individual that made the contribution (which might take the form of User ID-1 122) and identify the topic category 110, the topic 112, and the question 114 associated with contribution 120. In some embodiments, the contribution data 402 would also include the content of contribution 120.

The system server 210 receives the contribution data 402 and then extracts or derives information from the contribution data 402 concerning the individual using device 240. The system server 210 can then store this information in its system data 212. The information obtained from the contribution data 402 is referred to in FIG. 4 as individual forum data 410. This is shown as a dashed box 410 in FIG. 4, and the data elements within this box 410 comprise that information that is obtained by analysis of the contribution data 402 received from a system application 494. Part of this data 410 is the individual's identifier 412. In one embodiment, the individual's identifier 412 stored in the system data 212 is different than the individual IDs 320 stored in the forum data 230 maintained by the various forum servers 220. The individual forum identifiers 320 are used only by a particular forum server 220, while the individual identifier 412 in the system data 212 constitutes a singular identifier for an individual used by the system server 210 itself. The system server 210 is able to convert between the system's individual identifier 412 and the identifiers 320 used by the various forum servers 220 by storing credentials 414 within the individual forum data 410. The credentials 414 will usually take the form of forum identifiers 320 and passwords used to log into a forum server 220. A single individual identifier 412 may be associated with credentials 414 for a plurality of different third-party forum servers 220. In this way, the contribution data 402 sent by the system applications 494 might contain only the forum identifier 320 used by the forum server 220, and the system server 210 can identify the correct system individual identifier 412.

The individual forum data 410 also includes information about all the contributions made by the individual. These contributions are stored in database entity 430, meaning that a contribution 400 made to the forum server 220 will generate an instance of the contributions database entity 430. Each contribution 430 will be associated with the identifier 412 for the individual that made that contribution 430. Furthermore, like the contributions 300 maintained in the first forum data 232, the contributions 430 can be linked to other contributions 430 in a conversational hierarchy, with a single conversation having contributions 430 that are associated with a plurality of different individual identifiers.

In one embodiment, the system server 210 maintains "points" 440 earned by an individual through their contributions 430. Points 440 can be assigned to contributions 430 in a variety of ways. For example, a set number of points 440 can be assigned for each contribution 430 regardless of the content of the contribution 430. Alternatively, the system server 210 can evaluate received contribution data 402 for a contribution 400, determine the "quality" of the contribution 400, assign points based on the quality, and then save the content as a new contribution entry 430 in the forum data 410 along with the assigned points 440. The determination of quality can be based on a variety of factors, including a textual analysis of any text portion associated with the contribution 430. The textual analysis may reveal the number of words in the contribution 430 and the complexity of the words. The textual analysis may also analyze the grammar of the text portion to ensure that the contribution is submitted in full, grammatical sentences. As explained below in connection with FIG. 12, it is also possible to revisit known contributions 430 by requesting data from forum server 220 concerning the feedback and ratings 340 given to a particular contribution 430, as well as the responses by other users to this contribution 430 and even further replies to the responses made by the contributing individual. This data will then be used to assign points 440 for a particular contribution 430, where a highly-rated contribution 430 as revealed by the ratings 340 can be assigned a higher number of points 440. Furthermore, a contribution that triggered multiple replies can also be given more points 440. In one example, for each individual 412, the system 210 sums up the points 440 from contributions 430 from that individual 412 and tracks that sum as the total points 440 earned by the individual 412.

Another goal of the server 210 is to identify particular skills of the individual that created the contribution 430. These identified skills are stored in the system data 212 in skill database entities 450 that are associated in the data store 212 with the contributions 430. The identification of skills 450 by the system server 210 can be based on the topic(s) 310 that are associated with a contribution 400, as identified in the contribution data 402 submitted to the system server 210. For example, contribution 120 is associated with the Ruby on Rails topic 112, and in particular is associated with a question 114 concerning the spawning of child processes. If this contribution 120 were the submitted contribution 400, the system server 210 would be able to identify that the contribution 400 relates to i) Ruby on Rails, ii) spawning child processes, and iii) website development. If the contribution 120 is worthy of points 440 or is otherwise considered a quality contribution 120, then the system server 210 will identify skills 450 related to these three topics and store those skills 450 in the individual forum data 410.

In some embodiments, the assignment of a skill 450 to a contribution 430 can be used to determine the strength or magnitude of the individual's aptitude on that skill. For example, an individual 412 that has made five, highly-rated contributions 430 in a third-party forum related to a skill 450 would be considered to have more strength in that skill 450 than another individual 412 that has only submitted one unrated contribution 430 related to that skill 450. This can be determined simply be examining the number of association paths found in the individual forum data 410 between the individual identifier 412 and the skill entity 450. The concept of an association path identifies that the individual identifier 412 is associated with a skill 450 even though the link of that association path passes through a contribution 430 (or a learning 460) in FIG. 4. An association path does not need to pass through one or more other data entities, thus FIG. 4 shows an association path between the individual identifier 412 and the skill 450 as well as an association path between the individual identifier 412 and the contribution 430. In the present disclosure, an "association" can be a direct association between two data entities or an association path that passes through multiple data entities.

The magnitude or strength of a skill 450 identified with an individual identifier 412 could be based on the number of contributions 430 that relate to that skill 450 and/or the points 440 awarded for these contributions 430. Alternatively, the associations between a contribution 430 and a skill 450 in the individual forum data 410 can each be associated with a strength or value rating. In addition, even if the system server 210 does not use the feedback and ratings scores 340 for contributions 430 to determine the points 440 awarded for a contribution, the feedback and ratings scores 340 could still be analyzed by the system server 210 in order to determine the magnitude or strength of the skill 450 associated with that contribution 430. Then the system server 210 could analyze all skills 450 assigned to the individual identifier 412 (via contributions 430) to determine the variety and overall strength of skills 450 associated with the individual 412.

In some embodiments, the interactions with a second individual using the forum server 220 will be analyzed more deeply by the system server 210. In the example of FIG. 1, contribution 120 generated a response 130 by a second individual, and this response 130 could be received and analyzed by the system server 210 (such as by using the method described below in connection with FIG. 12). The system server 210 may recognize User ID-2 132 as a second individual (with an identifier 412) for whom data is maintained in the individual forum data 410. If this second individual is considered highly skilled in a topic (such as Ruby on Rails 112), then the interaction shown in FIG. 1 with this skilled expert on this topic will indicate that the individual who wrote contribution 120 and reply 140 is also likely to be highly skilled in this same topic 112. This additional knowledge can be compared to feedback/ratings 340 for the actual contribution 120 and the reply 140 to further confirm or to reject this indication. In this way, an individual's interaction with known experts on a topic in a third-party forum 220 can increase the individual's magnitude or strength for a skill 450.

As explained above, the skills 450 associated with a contribution 430 can be based on the topics under which the forum server 220 placed this contribution 430. In FIG. 4, the system data 212 tracks the forum topics 470 that are made available on the various forum servers 220 and associates these topics 470 with specific skills 450 that are tracked by the system data 212. The association between forum topics 470 and the system skills 450 can be based on a many-to-many relationship. For instance, the forum server 220 that provided interface 100 is known to have a topic category 110 related to Website Development and another topic 112 related to Ruby on Rails. These topics may be hard-coded into the programming of the forum server 220, meaning that they were not created by mere users of the forum server 220 but were pre-programmed by the administrators of the forum. Individual users can create questions 114 or subtopics, but these must be placed into the predefined hierarchy of topics established by the forum server 220. In this case, the system data 212 can associate these preestablished/known topics 470 found at a forum server 220 with known skills 450 that are tracked in data store 212. For example, the system server 210 might care about the following skills 450: "programming," "user interface design," "e-commerce platform development." These skills 450 do not correlate one-to-one with the predefined topics 470 at the forum server 220, but relationships between the topics 470 and the skills 450 maintained by the system data 212 make it easier to assign skills 450 for any contribution 430 made through that forum server 220. Thus, quality contributions to the Ruby on Rails topic 112 will indicate the individual is skilled in programming in general and e-commerce platform development in particular. Another topic 470 maintained by the forum server 220, such one on credit card processing, could also be associated with the e-commerce platform development skill 450.

In other embodiments, the textual content of the contribution 430 is individually analyzed to determine which skill 450 should be assigned. One way to match textual content with skills 450 is the identification of keywords and key phrases (together referred to herein as keywords). An individual skill 450 may be assigned a plurality of keywords, and searches for those keywords will then be made in the textual content of a new contribution 430. For example, some of the keywords for a "ecommerce platform development" skill 450 may be "Ruby on Rails," "credit card," "ecommerce," "Stripe," "gift cards," etc. The system server 210 could examine the textual content of the new contribution 430, count the occurrences of any of these keywords, and determine whether the count is sufficient to assign the ecommerce platform development skill 450 to the contribution 430. A sufficient count may be a minimum number of any keywords (e.g., at least five keywords), a minimum number of distinct keywords (e.g., at least two distinct keywords such as "Ruby on Rails"), or a percentage of keywords when compared to the total number of words in a contribution 430 (e.g., at least 30% of the words of the contribution are keywords).

In yet another embodiment, the system application 494 stores data in its own local forum data 496. In FIG. 4, local forum data 496 is only shown in connection with the local computer 480, but the local forum data 496 can be used with any of the individual computing devices 240. Local forum data 496 contains some of the same information that is stored in the individual forum data 410 in the system data 212. The local forum data 496 allows individuals that use the devices 240 to access a local version of their contribution information 430. It effectively becomes a local notebook that stores all of an individual's contributions 400 to a variety of forum servers 220. In some embodiments, the local forum data 496 does not contain points 440 or skills 450, but rather serves only as a repository for contributions 430 (and learnings 460, as described below). This data can be stored in a write-only/additive manner, which means that the user will not be able to edit or delete the information stored in the local forum data 496. An interface provided by the system application 494 (not shown in the Figures) can then allow the user to examine, search through, and list all of the contributions 430 and learnings 460 stored in the local forum data 496. In one embodiment, the local forum data 496 is actually stored locally in or near the individual computer device 240. In other embodiments, the local forum data 496 is centrally stored (such as by using cloud-based storage services) so that it can be accessed by an individual that uses multiple individual computing devices 240 regardless of which device 240 was being used. In these latter embodiments, the data 496 is "local" in that it is used only by the system applications 494 on the individual computing devices 240 and it does not form part of the system data 212 used by the system server 210.

FIG. 4 shows that each contribution 430 is associated with an individual identifier 412, and each contribution 430 can be associated with both points 440 and skills 450. In this way, the system data 212 is able to identify all of the points 440 and skills 450 for an individual identifier that have been accumulated through a variety of contributions 430 even when these contributions are made to a plurality of different third-party forum servers 220.

In a similar manner, the system server can track learnings 460, associate a learning 460 with an individual identifier 412, and associate the learning 460 with both points 440 and skills 450. A learning 460 is essentially a receipt of information at an individual device 240 from a forum server 220. Ideally, each learning 460 will be intended to teach an individual using the individual device 240 a skill 450. FIG. 5 shows system 20 where only a single individual computing device 240 and its system application 494 is shown. In FIG. 5, some learning 500 is being transmitted from the forum server 220, over the network 200, to an individual computing device 240.

The receipt of this learning 500 is identified by the system application 494 operating on the individual computer. In one embodiment, the system application 494 identifies the learning 500 and monitors the display or other presentation of the learning 500 to the individual to ensure that the entire learning 500 has been presented. For example, if the learning 500 were a training video, the system application 494 would ensure that the entire training video were presented. If the learning 500 were a series of web pages, the system application 494 would ensure that the entire series of web pages were displayed. Upon confirmation that the entire learning 500 were presented over the individual computing device 240, the system application 494 would send a confirmation of knowledge received message 510 to the system server 210. This confirmation message (also known as learning confirmation data) 510 would identify the learning 500 received (which will likely identify the forum server 220 that transmitted the learning) and an individual identifier 412.

Upon receiving the confirmation 510 that the learning 500 was presented to the individual, a learning database entity 460 is created in the individual forum data 410 that is associated with the correct individual ID 412. The system server 210 would then identify a number of points 440 to be assigned to the individual 412 based on receiving this learning 500. In addition, the system server 210 is responsible for identifying one or more skills 450 that should be learned or improved by an individual receiving this learning 500. For example, if the learning 500 constituted a training video provided by the forum server 220 on the topic of spawning a child process using Ruby on Rails, the system server 210 may identify the same set of skills for this learning 500 as it did for the forum contribution 120. In all cases, the skills 450 identified for a learning 500 will be based on the content/topic of the learning 500.

While the forum server 220 exercises control of the topic 310 assigned to a contribution 300 (see FIG. 3), management of learning topics may be quite different. In some embodiments, an entity that manages the forum server 220 may pre-identify possible learnings 500 to the system server 210 so that each possible learning can be pre-associated with one or more skills 450. In return for this cooperation, the system server 210 may be programmed to provide biographical data 520 to the forum server 220 for each individual that completes learning 500. This presumes that the system server 210 maintains biographical data 520 concerning the individuals, that the system server 210 has more such biographical data 520 than the forum server 220, and that the forum server 220 has a desire to obtain this additional biographical data 520. This further presumes that the individual has granted permission for the system server 210 to provide data to the forum server 220. This cooperation allows for pre-examination of the available learning materials 500 provided by the forum server 220, and for the pre-assignment of skills 450 to those learnings 500.

In this way, the overall points 440 associated with an individual identifier 412 will include points 440 awarded for making contributions 430 to third-party forum servers 220 and points awarded for receiving the presentation of learnings 500 from the third-party forum servers 220. Similarly, skills 450 associated with the individuals 412 in the forum data 410 will include the combination of skills 450 identified for contributions 430 and skills 450 identified for learnings 500. Of course, the system server 210 is able to monitor the use of multiple forum servers 220 by the same set of individuals.

Time-To-Live Data and Improved Search Results

FIG. 4 shows that the system server 210 contains cached individual forum data with time-to-live (TTL) 420. In one embodiment, the system server 210 analyzes contribution data 402 and learning confirmations 510 and identifies points 440 and skills 450 based on those inputs as described above. But rather than immediately storing this data permanently in the individual forum data 410 on the system data store 212, the system server 210 maintains this data in a data cache 420.

The cached data 420 is different than a standard data cache, in which data permanently stored in remote or slow data storage is temporarily stored in closer or faster data storage to increase the speed of data queries. Rather than duplicating the individual forum data 410, the cached individual forum data 420 contains new data that has not been stored in the system data store 212 and might never be stored permanently in that data store 212. It is not necessary that the cached individual forum data 420 is stored in a faster, transient storage device (transient meaning that the storage device might not remember the data when powered down). In some embodiments, the cached data 420 is stored on a permanent storage device that is no faster and no closer to the processor(s) of the system server 210 than the individual forum data 410 stored on the data store 212. In fact, it is possible that the cached individual forum data 420 is stored on the same storage device(s) that stores the system data store 212. The location or format of how the cached individual forum data 420 is stored is not directly relevant to the present disclosure.

Rather, it is important to note that this data 420 is not integrated into the permanent system data 212 until after a save event has occurred. Furthermore, this data 420 is subject to a time-to-live (TTL) limitation, meaning that if a save event does not occur before the TTL clock expires, this data 420 is deleted and is never permanently stored in the system data 212. This TTL feature is described in more detail below in connection with FIGS. 7 and 8.

The content of the cached individual forum data 420 will be similar in structure and types of data as the individual forum data 410. The cached data 420 will contain information about contributions 430 and learnings 460, will be associated those with individual identifiers 412, and will have assigned points 440 and skills 450 that are associated with the contributions 430, learnings 460, and individual identifiers 412. Like the individual forum data 410, the data in the cached individual forum data 420 can be stored encrypted or compressed on a physical storage or memory device.

Although the cached individual forum data 420 is kept separate from the system data 212, it still provides useful information when a search query is received from the search user device 250. Such a query 600 is shown in connection with system 20 shown in FIG. 6. In this Figure, the search user device 250 is shown containing search system programming 610. This programming 610 is similar to system application 494, in that it is programming 610 that allows the device 250 to communicate with the system server 210. The search system programming 610 can take the form of an application for a computer, an app for a mobile device, a plug-in for a browser software application, or any similar type of programming. In some embodiments, the search user device 250 communicates with the system server 210 through a web interface, meaning that the search system programming need be only a standard web browser.

Figure 6:
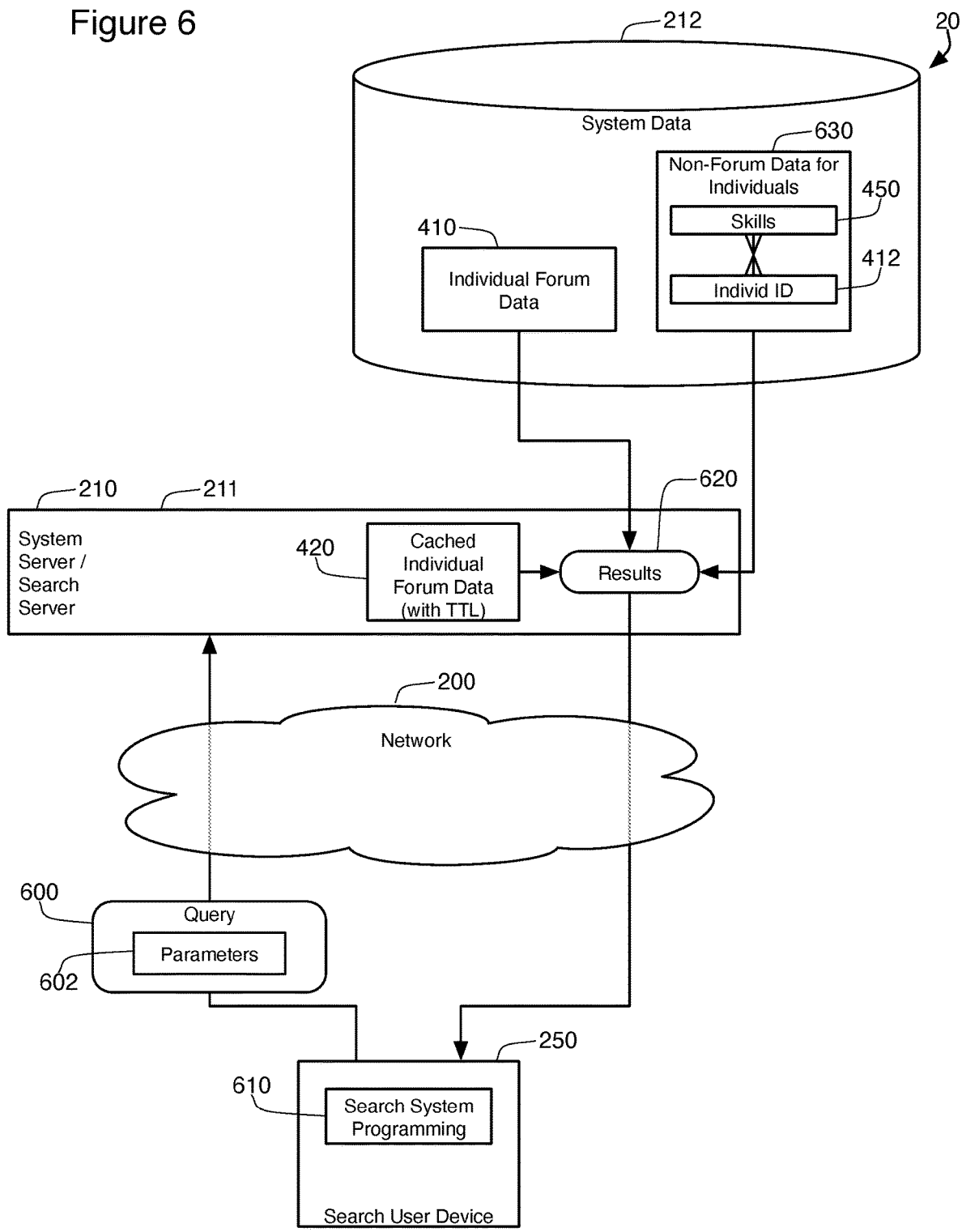
FIG. 6 is a schematic view of the system of FIG. 2 showing a search query from a user device.

In FIG. 6, the system server 210 is also labeled the search server 211. This is because the handling of the query 600 can be handled by the same computer system operating the system server 210, but it can also be handled by a separate computer system altogether. Alternatively, the same computer system can operate a first set of programming instructions to operate as the system server 210 as described above in connection with FIGS. 1-5, and a second set of programming instructions to operate as the search server 211. For the sake of simplicity, the functions of the search server 211 will be discussed in the following discussion as being performed by the system server 210.

One of the primary purposes of the search system programming 610 is to submit a query 600 to the system server 210. This query 600 generally takes the form of requesting search results that contain identifiers or information concerning one or more individuals, such as the individual identifiers 412 found in the individual forum data 410. The searching and sorting for these individuals/identifiers 412 will involve comparing the skills 450 associated with the individual identifiers 412 against skills specified by, or derived from, the query 600.

In FIG. 6, the query is submitted with parameters 602 that identify the parameters of the query 600. These parameters 602 might specify specific skills such as the skills 450 maintained in the system data 212. Alternatively, the requirements may specify something else that can be converted into one or more skills 450 by the system server 210. For example, the query 600 might relate to a job posting, which requires certain minimum skills from its job candidates. The specific skills might be listed as requirements or desired attribute parameters 602 within the job posting search query 600. These search parameters 602 can be the same as, or can be related to, the skills 450 maintained in the individual forum data 410 and the cached individual forum data 420. For example, a search parameter 602 might request a search for individuals skilled at "ecommerce development," which could be identical to a skill 450 maintained in the system data 212. Alternatively, the skill parameter 602 in the query 600 might need to be translated or converted to a skill 450 in the same manner as topics 470 can be converted into skills 450, as described above. In some embodiments, parameter 602 in the query 600 might simply list a job title, and the system server 210 would then be responsible for identifying a plurality of different skills 450 that are relevant to that query 600. In another example, the query can relate to a friend-matching system in which interest and skills of the searching party are compared with multiple individuals to find a compatible match. The query could also relate to a search for an individual that has sufficient skills to perform a one-time service for the searching party. In another example, the query could relate to a search for a candidate for political office who has skills that are valued by the user to evaluate how the user will vote or how the user will donate to political candidates.

Once the query 600 is received by the system server 210 over the network 200, the server 210 must develop results 620 for the query 600 and then return the results 620 to the search user device 250 back over the network 200. The results 620 are created by searching for individuals (individual identifiers 412) having skills 450 that match or are otherwise relevant to the parameters 602 of the query 600. The system server 210 can search the individual forum data 410 for individuals 412 permanently stored in the system data 212 to identify individual identifiers 412 for the results. Also, since the cached candidate data 420 contains the same type of data for contributions 430 and learnings 460 that have not yet been permanently stored in the system data 212, the system server 210 will also use this data 420 to define the results 620.

In many embodiments, a third source of data 630 will also be used to generate results. This third source 630 is found in the system data 212, but it is not based on interaction with third-party forums 220 and therefore it does not form part of the individual forum data 410. Consequently, this third source 630 can be considered "non-forum data." This non-forum data 630 can still relate to the same individuals that use the individual computing devices 240, and hence may relate to the same set of individual identifiers 412. In some embodiments, individuals use their individual computing devices 240 to log into, or sign up with, the system server 210 in order to participate in the overall system 20. During this process, the individual can manually submit data 630 concerning themselves for storage in the system data 212. For instance, the individual might manually identify skills 450 that they have, and this information can be stored in the non-forum data 630 in association with their individual identifier 412. Alternatively, the individual might submit a text-based resume, from which information about a user's skills 450 can be obtained. Video interviews can also be used to generate this non-forum data 630. The assignee of the present invention has filed numerous applications relating to video interviews with individuals in which data concerning the individual is extracted from audio, visual, and motion data taken concerning that individual (see, e.g., U.S. Pat. Nos. 10,728,443; 10,963,841; and 11,023,735 and US Patent Publication Nos. 2021/0158663 and 2021/0233262). This extracted data can also be stored in the non-forum data for individuals 630.

The system server 210 therefore analyzes the query 600 and its parameters 602, and then analyzes the cached individual forum data 420, individual forum data 410 found on the system data store 212, and the non-forum data for individuals 630 also found on the system data store 212. The result of this analysis is the generation of results 620, which are based on data related to the individual identifiers 412 associated with the skills 450 required by the parameters 602. In some embodiments, the results 620 specify the actual individual identifiers 412. Alternatively, the results 620 can provide other data about the individuals associated with the individual identifiers 412. This other data might constitute personally identifiable information ("PII") that is sufficient to identify the individual associated with the identifier 412, such as the individual's name and contact information. Alternatively, the other data may be data associated with the individual identifier 412 but is not PII. For example, the other data may simply be a created identifier unique to the results 620 count, such as "individual number 1" and "individual number 2" for results 620 that identified only two individuals.

The results 620 are preferably filtered and sorted so as to prioritize the best fit among the individual identifiers 412 that are determined to be relevant to the query parameters 602. The filtered and sorted results 620 are then returned to the search user device 250.

As an example, a parameter 602 that requires a very strong ability in a certain skill 450 would trigger the system server 210 to sort the results 620 based on the strength of the association between that skill 450 with the individual 412. In the context of the individual forum data 410 and the cached individual forum data 420, the strength of the association can be based on the analysis described above. In one embodiment, the strength of association is rated on a numerical scale, such as a whole number between 1 to 3. The system server 210 can examine the number of contributions 430 and learnings 460 related to that skill, can examine the feedback and ratings 340 for those contributions 430, and can then use this information to assign a strength number. An individual ID 430 associated with a single contribution 430 of a first skill 450 might only have a strength of 1. In contrast, a different individual ID 430 that is associated with numerous contributions 430 associated with the same first skill 450, some of which have numerous positive feedback ratings 340, would be given a strength of 3.

As explained above, the cached individual forum data 420 is governed by a time-to-live clock. The concept of time-to-live, or TTL, is well known in the caching context in identifying stale cache data. In these prior art systems, data found in a more permanent storage location is loaded into cache memory for faster processing. The data is allowed to remain in the cache for a set time period only, which is known as the time to live. A clock determines when this period has expired. Upon expiration of this time, the data in the cache is considered to be stale, and data must be read from the permanent storage to refresh the content of the cache and create a new TTL. The TTL concept can also be used in computer networking to prevent a packet of data from being circulating indefinitely, causing a lost network packet to be discarded once its TTL has expired.

Figure 7:
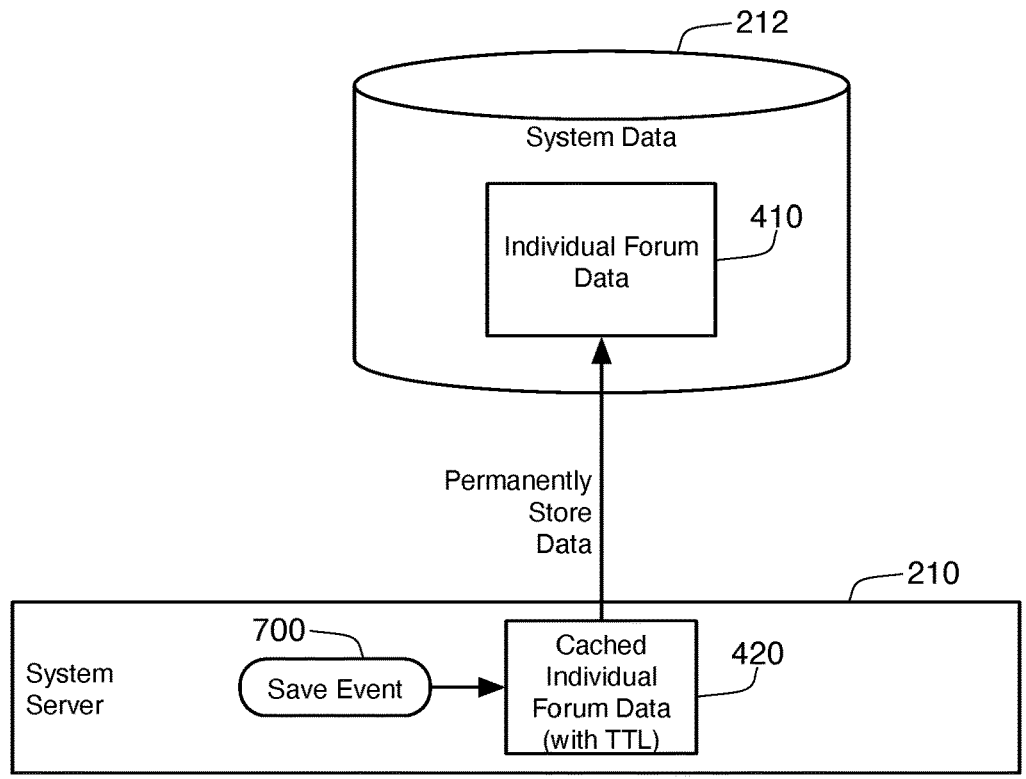
FIG. 7 is a schematic view showing data flow between a system server and a system data store triggered by a save event.

The present use of the TTL value in the cached individual data 420 is unique because the cached data 420 is not a duplicate of other data, as is typically the case with typical data caches. Nor is the cached individual forum data 420 data that is lost in transmission. Rather, the cached individual forum data 420 is destined to remain separate from the individual forum data 410 until the occurrence of a save event 700, as is shown in FIG. 7. Save events 700 are specific to one individual. When a save event 700 does occur, the cached individual forum data 420 for that individual is permanently stored into the individual forum data 410 in the system data 212 and then is deleted from the cached individual forum data 420. Once the data is stored in the individual forum data 410, it cannot be lost.

Figure 8:
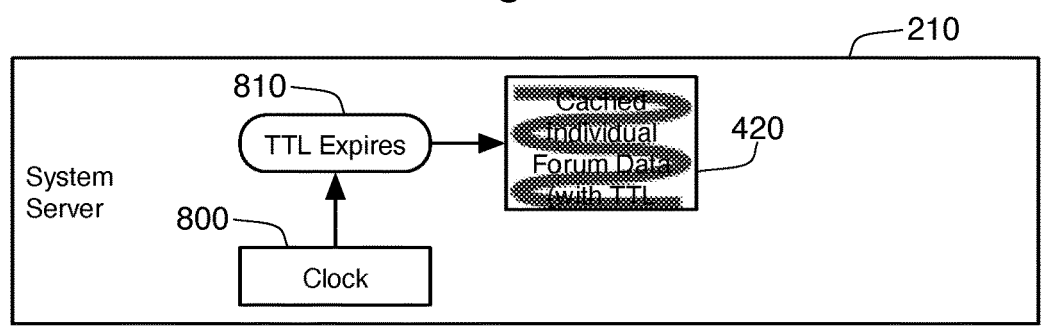
FIG. 8 is a schematic view showing data loss upon expiration of a time-to-live clock.

The time-to-live for the cached individual forum data 420 is maintained separately from individual to individual. As shown in FIG. 8, if a clock 800 indicates that a TTL expiration 810 for an individual's cached data 420 has occurred before a save event 700 for that individual is detected, then the system server 210 will delete that individual's cached forum data 420. For example, the time-tolive for the cached data 420 may be one month. If the user 412 associated with that cached data 420 has not utilized the system 20 for one month, a TTL expiration 810 will occur and the cached data 420 will be deleted. Once deleted, the points 440 and skills 450 associated with the identified contributions 430 and learnings 460 that were found in the cached data 420 will be lost.

In other words, an individual using individual device 240 can interact with the forum servers 220. This interaction will be monitored by the system server 210, and result in the assignment of points 440 and skills 450 to an individual identifier 412 associated with the user. The points 440 can be used by the individual as described below, while the skills 450 will help the individual appear in search results 620. But these points 440 and skills 450 are temporary and can be lost unless the individual triggers a save event 700 that stores their data permanently in the individual forum data 410 of the system data 212.

One goal for this temporary assignment of points 440 and skills 450 is to encourage continued use of the system 20 by the individuals, which means that save events 700 can be defined based upon use of system 20. For instance, one save event 700 may be daily contributions 430 to any third-party forum server 220 for a set number of days (such as seven days), which can be determined by either the system server 210 or the system application 494. Another save event 700 might be a set number of contribution data 402 and/or learning confirmations 510 received by the system server 210. For example, receiving contribution data 402 for a user 412 ten times may constitute a save event. In another example, receiving three learning confirmations 510 may be a save event. A different save event 700 might occur if the total number of points 440 associated with an individual identifier 412 exceeds some threshold amount, or the change in the number of points 440 associated with an individual identifier 412 over a limited time period exceeds a threshold amount.

In some instances, data concerning some individuals that are stored the cached individual forum data 420 may be particularly useful. For instance, this cached data 420 may indicate that a particular user identifier 412 is associated with a rare but highly-desirable skill 450. This fact could be identified before the TTL expires for this data because this cached data 420 causes the particular user identifier 412 to appear in search results 620 for one or more queries 600. To avoid losing highly valuable data such as this, the system 20 can create a save event for this information that is unrelated to the activity of the individual, but is instead based on an individual identifier appearing in a search result 620. In some embodiments, a save event 700 is created for an individual whenever their individual identifier (or related user data) is included a query result list 620 returned to any search user device 250. In other embodiments, this save event 700 is created only if the information that triggered the inclusion in the results 620 is found in the cached individual forum data 420. In these embodiments, if the inclusion in the results 620 resulted from information already stored in the system data 212 (namely in the individual forum data 410 or in the non-forum data for individuals 630), then a save event 700 is not triggered. In still other embodiments, the save event 700 is created only if the search results 620 rank the individual highly, such as appearing in the top ten, five, or two search results. It is also possible to count appearances in the search results 620, creating a save event 700 only if the data in the cached data 420 causes a particular user identifier 412 (or related user data) to appear in search results 620 for multiple queries 600.

In other embodiments, the user of the search user device 250 provides content through the system server 210 that is associated with the user or an entity associated with that user. For example, the user of the search user device 250 might work for a company that is searching for new employees using the system 20. This company may provide content through the system server 210 that is useful for an industry, or provides training to individuals using the individual devices 240, or otherwise provides a way for the company to make contact with those individuals. In these cases, mere interaction between the individual using individual device 240 and such content may trigger a save event 700, as may any other interaction between the individual device 240 and the search user device 250 that is facilitated by the system server 210.

In another embodiment, the individual device 240 is able to send to the system server 210 a request (not shown in the Figures) to delete the cached individual forum data 420 associated with their identifier 412. In this embodiment, the cached individual forum data 420 can be deleted either by a time-to-live expiration 810 or a specific request from an individual device 240.

Overall Method

Figure 9:
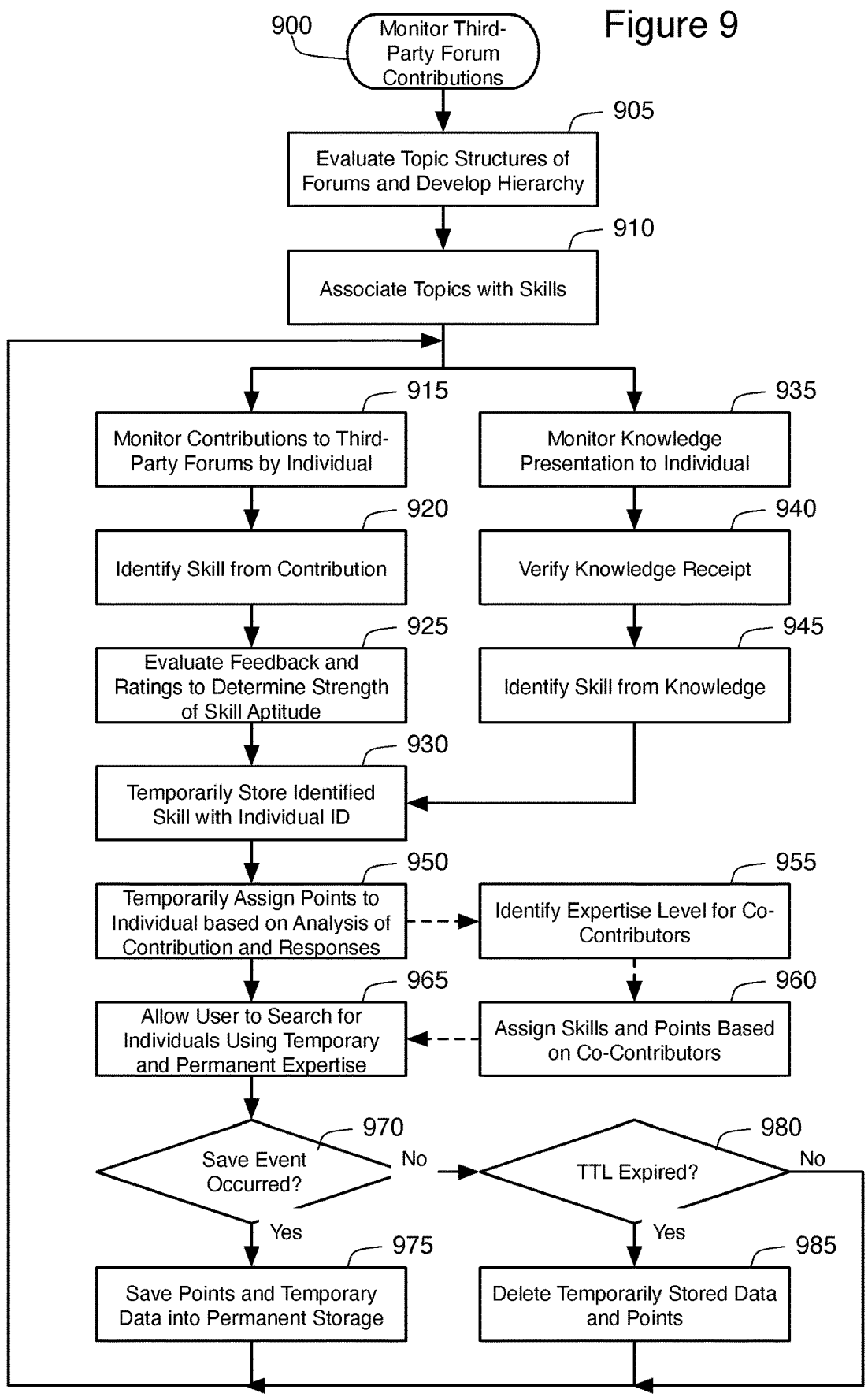
FIG. 9 is a flow chart showing a process of monitoring a third-party forum contribution to improve searching using time-to-live data assignments.

FIG. 9 contains a flow chart outlining the steps for a method 900 of monitoring contributions to third-party forums in order to improve search results. The method begins at step 905, in which the topic structure of a third-party forum 220 is analyzed. Forum servers 220 frequently use a hierarchical topic structure to organize contributions 120, such as the use of the topic category 110, topic 112, and question 114 structure shown in FIG. 1. In some forums 220, the hierarchical topic structure is predefined and static. In other forums 220, the structure is free form, and individuals are allowed to create and organize the topic structure of the forum 220 at the same time they are making contributions under that structure. In step 905, the system server 210 analyzes and understands the topic structure. The purpose for doing so is to allow the system server 210 to create associations of these topics in the topic structure with skills 450 that are defined in the system data 212. Referring back to FIG. 4, the topics 470 at a forum that are identified through step 905 are associated with skills 450 through data entities in system data 212 at step 910. This allows future contributions 430 at that forum 220 to be identified with a skill 450 based upon the topic in which it was placed at the forum 220.

At step 915, the system 20 monitors contributions made to one or more third-party forums 220 by an individual that is known by their individual ID 412. As explained above, this monitoring can take place through the use of a system application 494 operating on an individual computing device 240. In other embodiments, calls over an API interface 360 can be used by the system server 210 to request new contributions 300 that are found in a third-party forum's data 230 and which were made by individuals known to the system server 210. As explained above, the system data 212 will contain forum credentials 414 for the individuals being monitored by the system server 210. The credentials 414 can be used to periodically request information on new contributions by these individuals using the API interface 360. In another embodiment, the third-party forum server 220 will periodically push data to the system server 210 relating to contributions 300 made by certain individuals.

At step 920, skills 450 are assigned to the contribution 430 made by the individual 412. This assignment is relatively trivial if step 910 has already assigned topics 470 at that third-party forum server 220 to skills 450. If this did not occur, or if the topic under which a contribution 430 is made were unknown to the system server 210, skill assignment can be based upon a textual analysis of the unknown topic and the contribution itself 430. For instant, if the textual analysis of a contribution 430 identifies words and phrases such as "Ruby on Rails," "ecommerce", "credit card processing", "order", "user interface", and "fulfillment", the analysis may determine that this contribution 430 is to be associated with the ecommerce development skill 450.

At step 925, the system server 210 reaches out to the forum server 220 in an attempt to identify the feedback and ratings 340 for a particular contribution. This ability to examine the contribution 300 as it resides within the third-party forum 220 can take place through API calls 360 or through web navigation and data scraping. Techniques for placing API calls or for scraping data from a website are known in the prior art. As explained above, this data can then be used to determine a strength or magnitude for the assignment of this skill 450 to the contribution 430 and, hence, to the individual ID 412. This step 925 is described in more detail in connection with FIG. 12. At step 930, the contribution 430 and skill assignment 450 data are temporarily stored in the cached individual forum data 420.

At the same time the system server 210 is monitoring for received contributions data 402, it is also monitoring for learning confirmations 510 at step 935. If the system server 210 does receive a confirmation 510, step 940 will attempt to verify that knowledge was received. In some instances, the verification step 940 actually happens before the confirmation 510 is transmitted to the system server 210. For instance, the system application 494 can monitor the receipt of the learning 500. If the system application 494 has knowledge about the entirety of the learning 500 (such as the length of training video), it can assure that the entire video has been presented over the individual computing device 240 before the knowledge receipt confirmation 510 is transmitted to the system server 210. In other cases, an API call 360 is made to the forum server 220 presenting the learning 500 to seek confirmation that the learning 500 has been completed by the individual. Next, a skill entity 450 appropriate for this learning is identified at step 945. A learning data entity 460 and the identified skill entity 450 are then stored in association with the individual ID 412 in the cached individual forum data 420 at step 930.

At step 950, the system server 210 assigns points 440 to the contributions 430 and learnings 460 that have been identified. As explained above, the points 440 can be based on quantity of contributions 430 and learnings 460 identified. Alternatively, the quality of the contributions 430 and learnings 460 can be analyzed, with more points being awarded to higher quality contributions 430 and learnings 460.

In one embodiment, in the next step 955 the system server 210 reaches out to the third-party forum server 220 to identify and analyze any conversation that might have taken place relating to an identified contribution 430. Using the example of FIG. 1, response 130 and reply 140 both form part of the conversation relating to contribution 120. If a conversation is identified, the expertise level of the contributors to that conversation can also be identified at step 955 using the system data 212. At step 960, information retrieved about the conversation can be used to strengthen the assignment of skills 450 and increase the number of points 440 associated with a contribution 430. Note that steps 955 and 960 are connected to the rest of the method 900 through dotted arrows to indicate that these steps 955, 960 simply represent another embodiment. If this embodiment is not implemented, processing merely passes to the next step 965.

In step 965, a search user device 250 submits a query 600 with certain parameters 602 to the system server 210. The system server 210 then determines results 620 for that query 600 based on both cached individual forum data 420 and other, permanently stored individual forum data 410 in the system data 212. The system server can also consider non-forum data 630 in determining results for that query 600.

Step 970 then determines whether a save event 700 has occurred for any individual. If it has, step 975 will save the points 440 and skills 450 for that individual 412 into the permanently stored individual forum data 410. This data can then be removed from the cached individual forum data 420. In most cases, step 970 will also save the contributions 430 and learnings 460 to the permanent individual forum data 410. At that point, the method 900 will continue to monitor for contribution data 402 or learning confirmations 510 from this or other users.

If a save event has not occurred, step 980 determines if the time-to-live period for data in the cached individual forum data 420 has expired. If a TTL expiration 810 is detected, then step 985 will remove the data for that individual from the cached individual forum data 420 without permanently saving it. In some embodiments, a TTL expiration event 810 will delete contributions 430, points 440, skills 450, and learnings 460, but will not delete other data including new individual identifiers 412, credentials 414 used by the individual to log into a forum server 220, or information gained about topics 470. At this point, or if no TTL expiration 810 is detected, then the method 900 will continue to monitor for contribution data 402 or learning confirmations 510.

Rebuilding Lost Points and Skills

Figure 10:
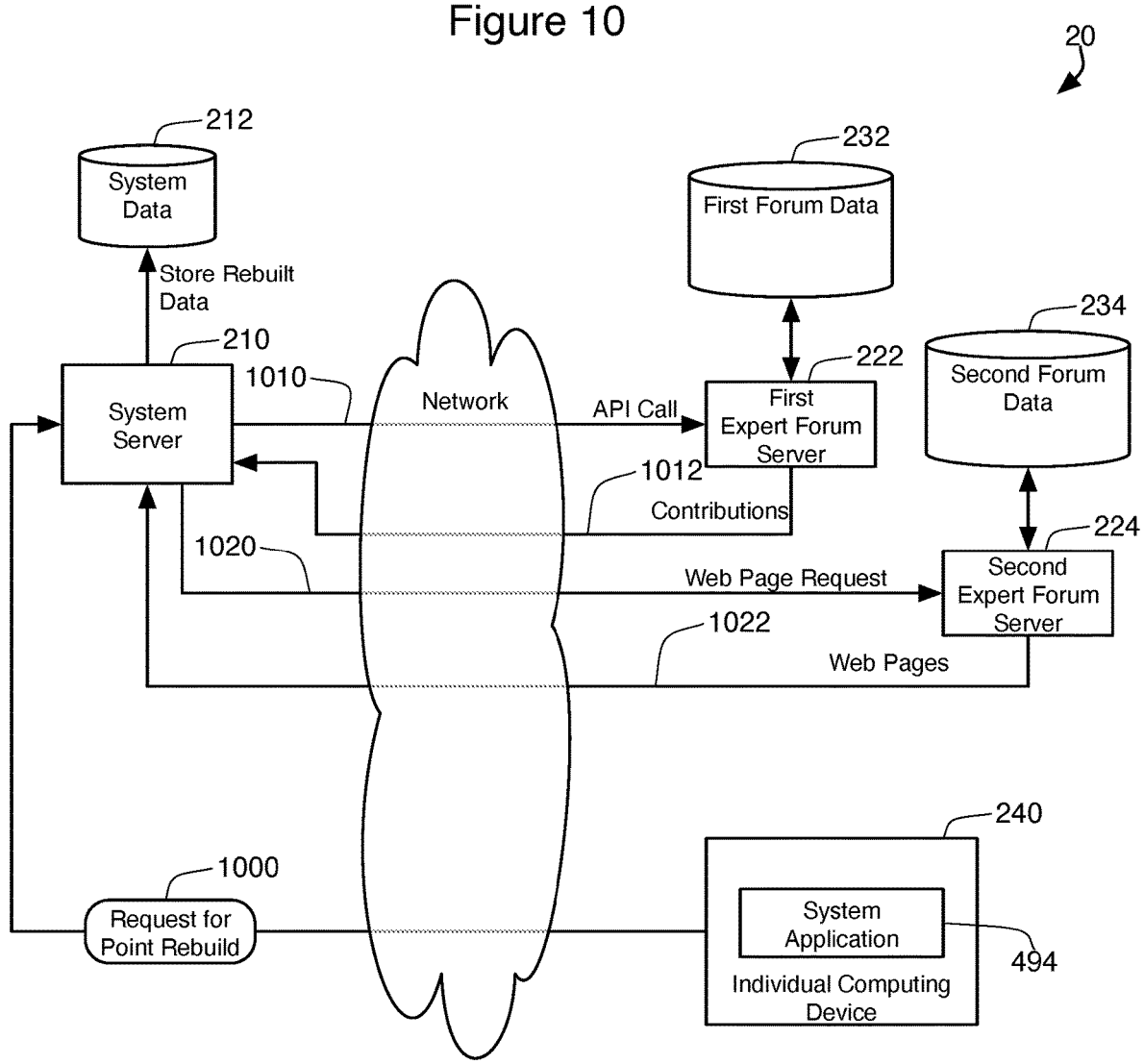
FIG. 10 is a schematic view of data communication after a request to rebuild point assignments.

FIG. 10 shows system 20 and the data flow that is triggered by a request for point rebuild 1000 sent by the system application 494 operating on an individual computing device. As explained above, points 440 and skills 450 associated with contributions 430 and learnings 460 are stored temporarily in the cached individual forum data 420, but this can be deleted if the TTL for that data expires. In systems where save events 700 are associated with continued or long-term use of the system 20, use of the system 20 by an individual that is followed by a long period of time may cause a TTL expiration event 810. This will cause a deletion of data in the cached individual forum data 420, and at a later point the individual may indicate a desire to recapture this lost data by sending a request for point rebuild 1000 to the system server 210. In some cases, a request for point rebuild 1000 will not be accepted unless earned by renewed use of the system 20, or unless paid for through some other type of compensation.

Figure 11:
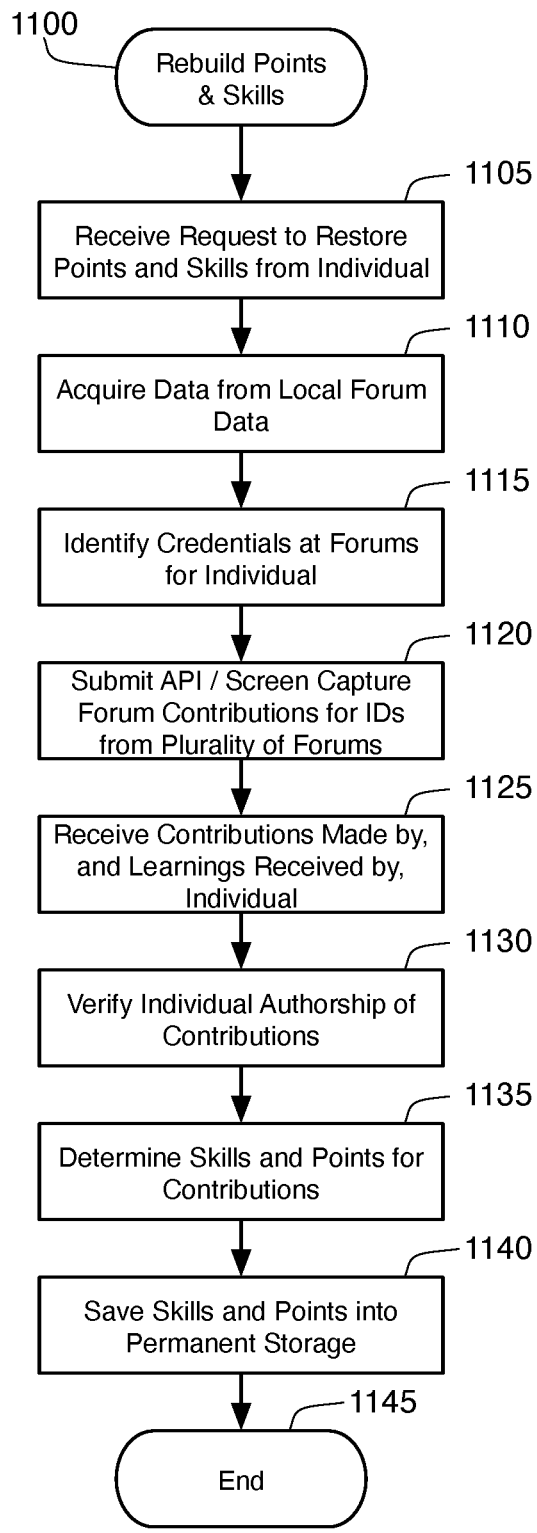
FIG. 11 is a flow chart showing a process of rebuilding data assignments and points.

FIG. 11 shows a method 1100 for rebuilding points 440 and skills 450. This method 1100 starts at step 1105 with the system server 210 receiving a request 1000 to restore points 440 and skills 450 for a particular individual. Such a request requires that the system server 210 identify all the contributions 430 and learnings 460 that may have been stored in the cached individual forum data 420 but were deleted in step 985. This request may also include identifying contributions 430 made to third-party forum servers 220 even before the individual began using the system 20. The first place to identify these contributions 430 and learnings 460 is by examining the local forum data 496 (assuming that the operating embodiment stores data in local forum data 496). This takes place at step 1110. The local forum data 496 is maintained by the system application 494. Thus, when the system server 210 that receives the request 1000 from an individual using the system application 494, the system server 210 can request this data 496 from that same system application 494.

In some cases, the local forum data 496 will be incomplete. Consequently, method 1100 will reach out to the forum servers 220 to identify contributions 400 and/or learnings 500 for this individual. The next step 1115, therefore, is to identify the credentials 414 for the identified user 412. These credentials 414 may come from previously stored data found on the individual forum data 410. As indicated above, credentials 414 may be permanently saved when learned by the system 20 and might not be deleted even upon the occurrence of a TTL expiration event 810. In some embodiments, the individual may submit credential information 414 along with the request for point rebuild 1000 so that the system server 210 can identify contributions 430 created by the individual at a new forum server 220.

At step 1120, the system server 210 will examine the third-party forum servers 220 for which it has credential information 414. In system 20, the system server 210 has API access 360 to the first expert forum server 222, and therefore submits an API request 1010 to that third-party forum server 222, as shown in FIG. 10. This API request 1010 includes the appropriate credential information to identify the individual. At step 1125, the third-party forum server 222 responds to the API request 1010 by returning the requested contributions 430 in an API response 1012. If available, the API response 1012 may also include information about learnings 460 transmitted to this individual by the forum server 222.

The system server 210 does not have API access to the second expert forum server 224. To obtain the necessary data, the system server 210 navigates through web pages provided by forum server 224 through requests 1020, until web pages 1022 containing the desired information are displayed and returned to the system server 210. The system server 210 can then scrape the relevant data from the received web pages 1022.

At step 1130, the system server 210 may decide to verify the authorship of the contributions 430 it received in step 1125. Verifying authorship can be necessary to prevent an individual from claiming credit for contributions made by another. This is especially relevant when an individual is requesting 1000 credit for points 440 and skills 450 from contributions made prior to enrolling with the system server 210 and system 20.

In one embodiment, the authorship of the contributions 430 received at step 1125 is not verified until the system application 494 has received written input from the individual. This input may be a separate contribution to a third-party forum 220, or it could be an answer to a question specially provided to the individual by the system application 494 operating on the individual device 240. This written input can then be compared with the writing in the contributions 430 received in step 1125. Known algorithms exist to compare writing samples to determine the likelihood that the same author wrote both writing samples. If the algorithm that compares the writing determines that it is reasonably likely that the writing received from the system application 494 matches the contributions identified in step 1125, then step 1130 has verified the authorship of the contributions.

In another embodiment, the system application 494 requests that the individual rewrite one of the contributions identified in step 1125. The new answer could be compared with the previously identified contribution for both style and content to verify that the individual was responsible for the identified contribution from step 1125.

If step 1130 verifies that the individual was the author of the identified contributions, then step 1135 determines the points 440 and skills 450 that should be assigned to the contributions 430 (and learnings 460) from step 1120. At step 1140, these points 440 and skills 450 are saved (along with the received contributions 430 and learnings 460) in the permanent individual forum data 410 stored on the system data store 212. The method then ends at step 1145.

Updating Data from Third-Party Forum Server

Figure 12:
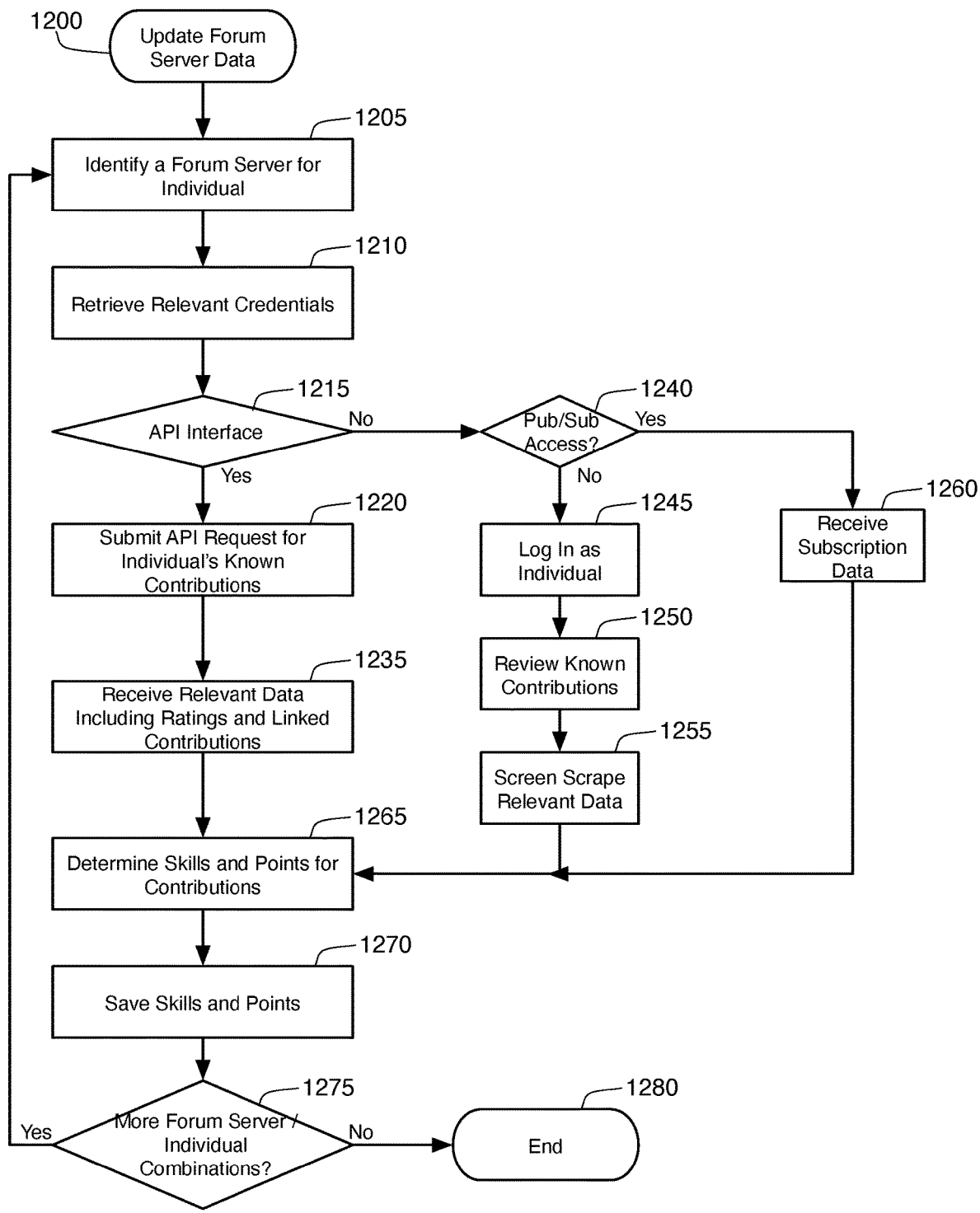
FIG. 12 is a flow chart showing a process for updating data relating to previously monitored contributions.

FIG. 12 contains a flow chart showing a method 1200 for updating data from a third-party forum server 220. As explained above, the system server 210 frequently receives contribution data 402 from an individual computing device 240 indicating that an individual has submitted a contribution 400 to a third-party forum server 220. Using the techniques described above, the system server 210 can create a contribution data entity 430 and then appropriately assign points 440 and skills 450 for that contribution 430. But since the contribution 430 was recently submitted to the third-party forum server 220, there is little possibility that other users have submitted ratings feedback (such as rating 124 shown in FIG. 1 in connection with contribution 120) or have made any responsive posts 130 that could form part of a conversation at the time the contribution data 402 is received.

Method 1200 allows the system server 210 to periodically revisit these old contributions on the third-party forum servers 220 to identify this type of data. The method 1200 begins with selecting a forum server 220 for an individual 412 at step 1205. Next, step 1210 identifies the individual's credentials 414 for that selected forum server 220.

Step 1215 then determines whether the system server 210 has an API interface 360 to this forum server 220. If so, then step 1220 submits an API request to that forum server 220 using the credentials 414 identified in step 1210. At step 1235, the system server 210 receives relevant data back from the API request, including ratings data 340 and other contributions that form part of a conversation on the forum server 220. This relevant information should relate to all of the contributions 430 that the individual 412 has submitted to this forum server 220.

If the system server 210 does not have an API interface 360 to the forum server 220, the system server 210 will determine at step 1240 whether or not it has access to the forum server 220 through a publish and subscribe system. If not, the system server 210 must scrape web pages to obtain the necessary information. To do so, it may be most efficient to log into the forum server 220 as the individual using the credentials 414, as shown at step 1245. In most cases, however, step 1245 is not necessary nor desired, as contributions are usually made available to all parties by the forum server 220, not just to the individual that submitted the contributions. At step 1250, the system server 210 navigates to the web pages containing the relevant contributions 430. The relevant contributions 430 are those contributions 430 already known by the system server 210 to have been made to the selected forum server 220 by this individual 412. Step 1255 then scrapes relevant data, including ratings 340 and other contributions that form part of the conversation related to the individual's contributions 430.

If step 1240 determines that a publish and subscribe system is available at the forum server 220, that means that the system server 210 can simply subscribe to updates made at the forum server 220. This subscription can relate to broad topics, such as topic 112 shown in FIG. 1, or on narrow topics or questions, such as question 114, or even on related contributions made to a single contribution, such as contribution 120. The system server 210 may subscribe to all contributions for which it received contribution data 402. In this way, whenever changes are made at the forum server 220 (such as a rating 124 or a related contribution 130, as shown in FIG. 1), the data will be published and pushed to the system server 210. The system server 210 then needs to only receive it subscribed data at step 1260.

Once the relevant data is received at steps 1235, 1255, or 1260, step 1265 determines whether any additional points 440 or skills 450 should be assigned to any of the individual's contributions 430. For example, the system server may evaluate the received relevant data and identify that an individual associated with other individual identifier 412 in the system data 212 has participated in a conversation concerning an original contribution 430 made by the individual identified in step 1205. Analysis may indicate that this other individual is highly skilled in the skill 450 that was associated with the original contribution 430. Participating in a conversation with a highly-skilled colleague as part of a contribution 430 may cause the system server 210 to strengthen the association made originally made between the contribution and the skill 450.

If step 1265 determines that points 440 or skills 450 should be increased or changed, step 1270 will create and save these additional or changed points 440 and skills 450. This data will be saved either in the permanently saved individual forum data 410 or the cached individual forum data 420, depending on where the associated contribution data entities 430 are stored.

At step 1275, the method 1200 determines if there are any more forum server/individual combinations to be examined. If so, the method returns to step 1205 for the identification of a new forum server/individual combination. If not, the method ends at step 1280.

In some embodiments, the method 1200 identifies only ratings 340 and conversation data that relate to already identified contributions 430. In other embodiments, the method 1200 will identify all contributions 430 made by the identified individual 412 at the selected forum server 220. New contribution data 430 (and awarded points 440 and skills 450) will then be stored alongside the updated points 440 and skills 450 at step 1265.

Use of Points

Figure 13:
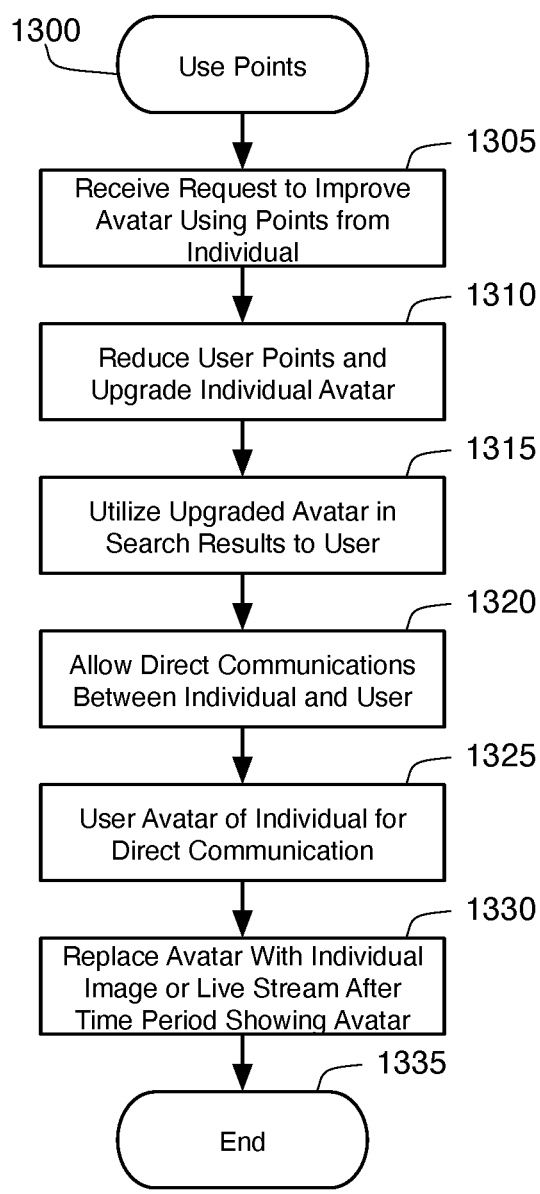
FIG. 13 is a flow chart showing a process of utilizing points.

FIG. 13 shows a method 1300 by which an individual can utilize/redeem their accumulated points 440. If points 440 were not tracked in the system 20, individuals might still be incentivized to use the system 20 because the improved search results 620 based on the system's improved knowledge of their skills 450 would be beneficial to them. Nonetheless, the accumulation of points 440 serves as an additional incentive for individuals to use the above-described system 20.

In one embodiment, individuals are able to display or otherwise share their total number of accumulated points 440 with other individuals. This can be accomplished through a mere presentation of a numeric point total. Alternatively, a user can be assigned a rank. The more points 440 accumulated by an individual, the higher their rank. This rank can then be shared with other users of the system 20 and also with other users of the various third-party forum servers 220. These ranks could be represented through avatars that are generated by the system 20. A user might obtain a rank of "General" or "Supreme Leader" or "T-Rex" based on their point total, and an avatar could be generated that reflects these rank titles.

In another embodiment, the system 20 could form part of a job search system in which employers use the search user device 250 to identify individuals that will apply for and accept their jobs. In this embodiment, the individuals that submit contributions 400 and receiving learnings 500 would be the same individuals that would apply for the jobs. In this context, the number of accumulated points 440 by an individual could be shared along with their identifying information (associated with their individual identifier 412) within the query results 620. Alternatively, these points 440 could also be converted into ranks, and their ranks (or related icons) could be displayed in the query results.

In a job searching system, biases can be avoided by having an initial conversation between an employer and a job candidate be partially anonymized. One method of doing so is to have job candidates presented (at least in the early stages of an interview and/or job application process) as an avatar. In this embodiment, the points 440 accumulated by an individual could be used to change the avatar that is shown in an employer. These avatars could be linked to the ranks described in the previous paragraph. Alternatively, a variety of avatars and alterations to the avatars could be made available to the individual in order to create custom avatars. Better avatars would be purchased for a higher number of points 440. Improvements and modifications to an existing avatar could also be purchased using accumulated points 440. Employers would understand that more elaborate avatars represent an individual that has more points 440, and therefore is likely to have more and stronger skills 450.

In this context, step 1305 of method 1300 is a request from an individual to improve an avatar using points 440 accumulated in the system 20. Step 1310 reduces the points 440 assigned to an individual identifier 412 and upgrades an avatar that is usable by that individual. At step 1315, this avatar is presented within the search results 620 that are returned to the search user device 250 whenever that individual's information is also included in those results 620.

At step 1320, the system 20 allows direct communication between the search user device 250 and the individual computing device 240 used by that individual. This interaction might take the form of a text-based chat, an audio conversation, or a video conference. At step 1325, the avatar improved at step 1310 is used to represent the individual during the direct communication with the search user device 250.

In the context of a video interview, it is possible that the avatar will replace the image of the individual shown on the search user device 250. Technologies are known where an individual's face can be replaced in real time with an avatar that moves as the individual moves and talks as the individual talks. Thus, the video conference described in step 1325 can include live audio communications with the face of the individual replaced by the avatar.

Studies have indicated that bias in the employment context is most likely to arise in the first few minutes of an in-person interview. Thus, the replacement of an individual's face during the first few minutes of the interview with an avatar might reduce bias. After those first few minutes, the use of the avatar might not be necessary. Thus, step 1330 eventually replaces the avatar with an image or live stream of the individual's actual face after a time period. The method 1300 then ends at step 1335.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A method comprising:
   a) at a system server, receiving first contribution data identifying a first individual identifier and a first contribution made to a first third-party forum;
   b) at the system server, receiving second contribution data identifying the first individual identifier and a second contribution to a second third-party forum, wherein the first third-party forum and the second third-party forum do not share forum data;
   c) verifying an authorship of the first contribution and the second contribution, wherein verifying the authorship comprises receiving additional input associated with the first individual identifier, wherein the additional input is received in response to a question sent to a system application operating on an individual's device;
   d) at the system server, identifying that a contribution skill is relevant to both the first contribution data and the second contribution data;
   e) at the system server, establishing within forum data:
      i) a first contribution association between a first contribution data entity containing the first contribution data and the first individual identifier;
      ii) a second contribution association between a second contribution data entity containing the second contribution data and the first individual identifier,
      iii) a first skill association between the first contribution data entity and the contribution skill thereby establishing a first association path between the first individual identifier and the contribution skill, and
      iv) a second skill association between the second contribution data entity and the contribution skill thereby establishing a second association path between the first individual identifier and the contribution skill;
   f) at the system server, establishing within the forum data for the first individual identifier a first point association between a contribution point value identified for the first contribution or the second contribution and the first individual identifier, wherein the contribution point value is identified based on textual analysis of the first contribution data or the second contribution data;
   g) at a search server, receiving a query from a search device that identifies the contribution skill;
   h) at the search server, identifying a plurality of individual identifiers in response to the query including the first individual identifier;
   i) at the search server, sorting the plurality of individual identifiers based on a strength of association between the plurality of individual identifiers and the contribution skill, wherein the first and second association paths between the first individual identifier to the contribution skill increases the strength of association for the first individual identifier;
   j) at the search server, returning search results reflecting the sorted plurality of individual identifiers to the search device.

2. The method of claim 1, wherein the contribution data includes contribution content, and further wherein the contribution point value is identified based upon an examination of the contribution content.

3. The method of claim 1, wherein the contribution skill is identified for the contribution by first determining a topic under which the contribution was made, and second determining the contribution skill based on the topic.

4. The method of claim 3, further comprising preliminary steps of evaluating a hierarchy of a plurality of topics found at the third-party forum, and creating an association between the plurality of topics and a plurality of skills.

5. The method of claim 1, wherein the search server is operating on a same computer system as the system server.

6. The method of claim 1, wherein the data related to the first individual identifier in the search results is personally identifiable information for the first individual.

7. The method of claim 1, wherein the first skill association is established within the forum data by establishing associations between an individual identifier data entity and a contribution data entity and between the contribution data entity and a skill data entity.

8. The method of claim 1, wherein a plurality of skills are associated with the first individual identifier in the forum data.

9. The method of claim 1, wherein a plurality of point values are associated with the first individual identifier in the forum data.

10. The method of claim 9, further comprising receiving a request from the first computing device to redeem point values associated with the first individual identifier.

11. The method of claim 10, wherein an avatar is associated with the first individual identifier, further wherein the search results present the avatar in conjunction with the data related to the first individual identifier, and still further wherein the request alters the avatar associated with the first individual identifier.

12. The method of claim 10, wherein an avatar is associated with the first individual identifier, further comprising a step of creating a live video link between the first computing device and the search device in which the avatar represents the first individual, and still further wherein the request alters the avatar associated with the first individual identifier.

13. The method of claim 1, wherein the forum data comprises temporary forum data and permanent forum data, further wherein the first skill association and the first point association are stored in the temporary forum data, further comprising identifying a time-to-live clock expiration associated with the first individual identifier and, consequently, deleting the first skill association and the first point association from the forum data.

14. The method of claim 1, wherein the forum data comprises temporary forum data and permanent forum data, further wherein the first skill association and the first point association are stored in the temporary forum data, further comprising identifying a save event associated with the first individual identifier and, consequently, storing the first skill association and the first point association into the permanent forum data.

15. The method of claim 14, wherein the step of searching to determine the search results comprises the save event.

16. The method of claim 14, wherein the save event comprises an event selected from a set of events consisting of:
   i) utilization of the system server by the first computing device for a determined time period;
   ii) accumulation of a total number of point values associated with the first individual identifier that exceeds a set threshold; and
   iii) interaction between the search device and the first computing device facilitated by the system server.

17. The method of claim 1, further comprising
j) at the system server, receiving learning confirmation data associated with the first individual identifier from the system application operating on the first computing device, the learning confirmation data identifying a learning received by the first computing device;
k) at the system server, determining a learning skill for the learning;
l) at the system server, establishing within the forum data a second skill association between the learning skill and the first individual identifier;
m) at the system server, determining a learning point value for the learning; and
n) at the system server, establishing within the forum data a second point association between the learning point value and the first individual identifier.

18. The method of claim 1, wherein the forum data further comprises temporary forum data and permanent forum data, further wherein the temporary forum data comprises data relating to a second individual identifier associated with a second individual; further comprising identifying a time-to-live clock expiration associated with the second individual identifier and, consequently, deleting the data relating to the second individual identifier; and still further comprising, in response to a request to restore the data associated with the second individual identifier:
   i) at the system server, identifying credentials associated with the second individual identifier at the third-party forum;
   ii) at the system server and using the credentials, requesting and receiving prior contributions previously made in association with the credentials at the third-party forum;
   iii) at the system server, for each of the prior contributions, determining an identified skill and an identified point value, and establishing, within the permanent forum data, associations between the second individual identifier and the identified skills and the identified point values.

19. The method of claim 18, further comprising, before determining the identified skill and the identified point value for each of the prior contributions, verifying that the second individual authored the prior contributions.

20. The method of claim 1, further comprising:
j) at the system server, receiving ratings for the contribution from the third-party forum;
k) at the system server, altering the first skill association between the contribution skill and the first individual identifier based on the ratings.

21. The method of claim 20
l) at the system server, receiving conversation data for the contribution from the third-party forum;
m) at the system server, identifying relevant data in the conversation data, wherein the relevant data identifies a third individual identifier for the conversation data and further wherein the relevant data is derived from analyzing the third individual identifier and the contribution skill;
n) at the system server, altering the first skill association between the contribution skill and the first individual identifier based on the relevant data.

22. The method of claim 1, wherein verifying the authorship of the first contribution and the second contribution comprises receiving additional input associated with the first individual identifier.

23. The method of claim 22, wherein the additional input is compared to the first contribution and the second contribution to determine the likelihood of that the same author created the additional input, the first contribution and the second contribution.

24. A method comprising:
a) at a system server, accessing temporary forum data and permanent forum data that together relate to a plurality of individuals associating skills with a first set of individual identifiers;
b) at the system server, receiving first contribution data identifying a first individual identifier and a first contribution made to a third-party forum;
c) at the system server, identifying a contribution skill and a contribution point value for the first contribution data;
d) at the system server, establishing within the temporary forum data:
   i) a first skill association between the first individual identifier and the contribution skill;
   ii) a first point association between the first individual identifier and the contribution point value;
e) at the system server, receiving a query identifying a query skill from a search user device;
f) at the system server, searching both the temporary forum data and permanent forum data for individual identifiers associated with the query skill;
g) at the system server, returning search results to the search user device;
h) at the system server, identifying a time-to-live clock expiration associated with the first individual identifier and, as a consequence, deleting the first skill association and the first point association from the temporary forum data;
i) at the system server, receiving a request to restore data associated with the first individual identifier, and in response to receiving the request:
   i) identifying credentials associated with the first individual identifier at the third-party forum;
   ii) at the system server and using the credentials, requesting and receiving prior contributions previously made in association with the credentials at the third-party forum;
   iii) at the system server, for each of the prior contributions, determining an identified skill and an identified point value, and establishing, within the permanent forum data, associations between the first individual identifier and the identified skills and the identified point values.

25. The method of claim 24, further comprising, before determining the identified skill and the identified point value for each of the prior contributions, verifying that an individual associated with the first individual identifier authored the prior contributions.

* * * * *